US009002816B2

(12) United States Patent
 Omura et al.

(10) Patent No.: US 9,002,816 B2
(45) Date of Patent: Apr. 7, 2015

(54) INFORMATION PROCESSING APPARATUS AND INFORMATION PROCESSING METHOD

(75) Inventors: Sumi Omura, Mitaka (JP); Takayuki Iida, Tachikawa (JP); Kensuke Horiuchi, Kunitachi (JP); Kentaro Nagahama, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 159 days.

(21) Appl. No.: 13/310,399

(22) Filed: Dec. 2, 2011

(65) Prior Publication Data

US 2012/0221601 A1      Aug. 30, 2012

(30) Foreign Application Priority Data

Feb. 28, 2011  (JP) .................................. 2011-042817

(51) Int. Cl.
 *G06F 17/30* (2006.01)

(52) U.S. Cl.
 CPC ...... *G06F 17/30864* (2013.01); *G06F 17/3064* (2013.01)

(58) Field of Classification Search
 CPC .......... G06F 17/2745; G06F 17/30864; G06F 17/30643; G06F 17/30634; G06F 17/30657; G06F 17/30693; G06F 17/3084; G06F 17/30929; G06F 17/30941; G06F 17/30979; G06F 17/3075
 USPC ................. 707/705–706, 723, 710, 722, 729; 715/205
 See application file for complete search history.

(56) References Cited

U.S. PATENT DOCUMENTS

| | | | |
|---|---|---|---|
| 6,014,672 A | 1/2000 | Satoh et al. | |
| 7,676,452 B2* | 3/2010 | Doganata et al. | 707/999.003 |
| 7,899,827 B2* | 3/2011 | Boyer et al. | 707/741 |
| 8,010,516 B2* | 8/2011 | Ishii et al. | 707/705 |
| 8,108,379 B2* | 1/2012 | Chi et al. | 707/708 |
| 8,438,598 B2* | 5/2013 | Sakai et al. | 725/46 |
| 8,554,775 B2* | 10/2013 | Kon et al. | 707/748 |
| 2003/0009767 A1* | 1/2003 | Narita et al. | 725/97 |
| 2004/0145652 A1* | 7/2004 | Yamauchi et al. | 348/14.02 |
| 2004/0249816 A1* | 12/2004 | Tada | 707/9 |

(Continued)

FOREIGN PATENT DOCUMENTS

| | | |
|---|---|---|
| JP | 10-063685 | 3/1998 |
| JP | 2002-149668 A2 | 5/2002 |

(Continued)

OTHER PUBLICATIONS

Official Letter of Inquiry received in Japanese Patent Application No. 2011-42817, mailed on May 21, 2013; in 11 pages.

(Continued)

*Primary Examiner* — Hanh Thai
(74) *Attorney, Agent, or Firm* — Knobbe Martens Olson & Bear LLP

(57) ABSTRACT

According to one embodiment, an information processing apparatus comprises a content display, an extraction module, a storage, and a keyword display. The content display is configured to display a content. The extraction module is configured to extract a keyword from the content displayed by the content display. The storage is configured to store a first keyword extracted by the extraction module. The keyword display is configured to display the first keyword extracted by the extraction module and a second keyword read from the storage.

24 Claims, 25 Drawing Sheets

(56) References Cited

U.S. PATENT DOCUMENTS

| | | | |
|---|---|---|---|
| 2006/0248061 A1* | 11/2006 | Kulakow et al. | 707/3 |
| 2006/0271527 A1* | 11/2006 | Kutsumi et al. | 707/3 |
| 2009/0018832 A1* | 1/2009 | Mukaigaito et al. | 704/251 |
| 2009/0089257 A1* | 4/2009 | Cho et al. | 707/3 |
| 2009/0112836 A1* | 4/2009 | Ishitani et al. | 707/5 |
| 2009/0132525 A1 | 5/2009 | Hattori et al. | |
| 2009/0183202 A1* | 7/2009 | Yoon et al. | 725/41 |
| 2009/0204611 A1* | 8/2009 | Kamada et al. | 707/5 |
| 2009/0241016 A1* | 9/2009 | Kihara et al. | 715/205 |
| 2010/0017390 A1* | 1/2010 | Yamasaki et al. | 707/5 |
| 2010/0260480 A1* | 10/2010 | Maeda | 386/95 |
| 2010/0333140 A1* | 12/2010 | Onodera et al. | 725/44 |
| 2011/0173215 A1* | 7/2011 | Yuyama et al. | 707/758 |
| 2011/0179021 A1* | 7/2011 | Wen et al. | 707/723 |
| 2011/0238495 A1* | 9/2011 | Kang | 705/14.49 |
| 2012/0123855 A1* | 5/2012 | Gu | 705/14.46 |
| 2012/0123863 A1* | 5/2012 | Kaul et al. | 705/14.52 |
| 2012/0136893 A1* | 5/2012 | Moon et al. | 707/769 |

FOREIGN PATENT DOCUMENTS

| | | |
|---|---|---|
| JP | 2003-157259 | 5/2003 |
| JP | 2004 023345 A2 | 1/2004 |
| JP | 2005 115790 A2 | 4/2005 |
| JP | 2007-128367 | 5/2007 |
| JP | 2008-250661 | 10/2008 |
| JP | 2009-077166 | 4/2009 |
| JP | 2009 129098 A2 | 6/2009 |

OTHER PUBLICATIONS

Office Action dated Apr. 22, 2014 in Japanese Application No. 2012-205966.

Decision of Rejection and Decision of Dismissal of Amendment dated Sep. 11, 2014, received in Japanese Patent Application No. 2012-205966—in 13 pages.

* cited by examiner

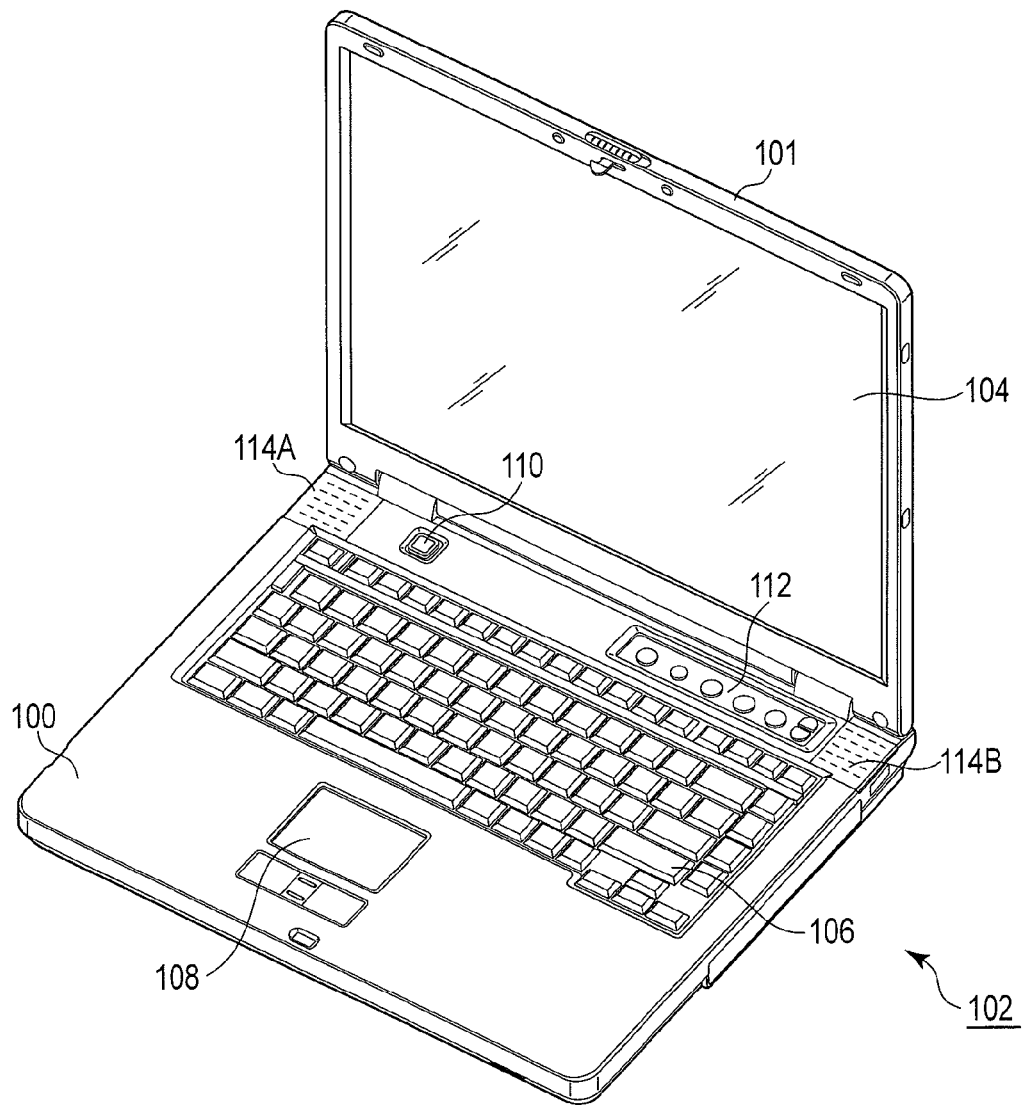
F I G. 1

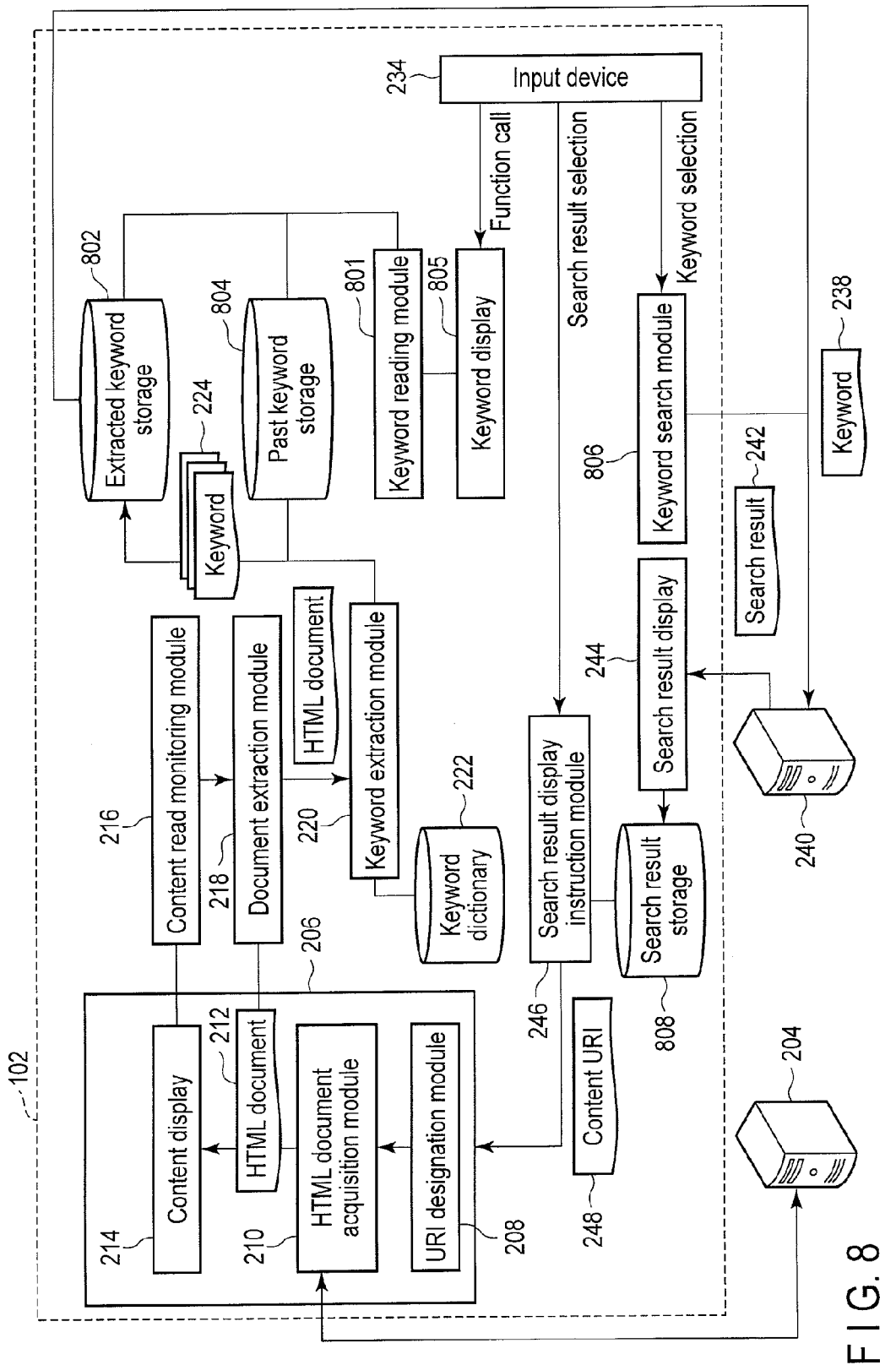
F I G. 8

802

| Date/time | Keyword | Search flag |
|---|---|---|
| 2010/11/24 11:21:10 | Football | 0 |
| 2010/11/24 11:21:10 | World Cup | 0 |
| 2010/11/24 11:21:10 | Japan | 0 |
| 2010/11/24 11:21:10 | Final | 0 |
| 2010/11/24 11:21:10 | Brazil | 0 |
| 2010/11/24 11:21:10 | Spain | 0 |

F I G. 9

$504_3$

| Extracted keyword | Past keyword |
|---|---|
| Football | 🔍 |
| Swimming race | 🔍 |
| Butterfly | |
| Marathon | |
| Gold medal | |
| Japan national team | |

F I G. 10

804

| Date/time | Keyword | Search flag |
|---|---|---|
| 2010/11/24 11:21:10 | Football | 1 |
| 2010/11/24 11:21:10 | World Cup | 0 |
| 2010/11/23 22:43:30 | Football | 0 |
| 2010/11/23 22:43:30 | Swimming race | 1 |

F I G. 11

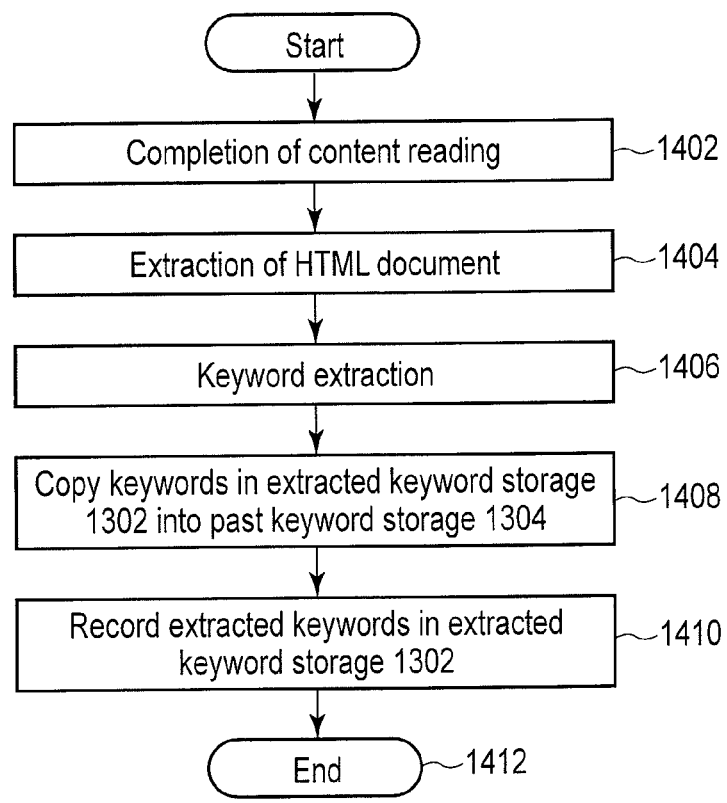
F I G. 14

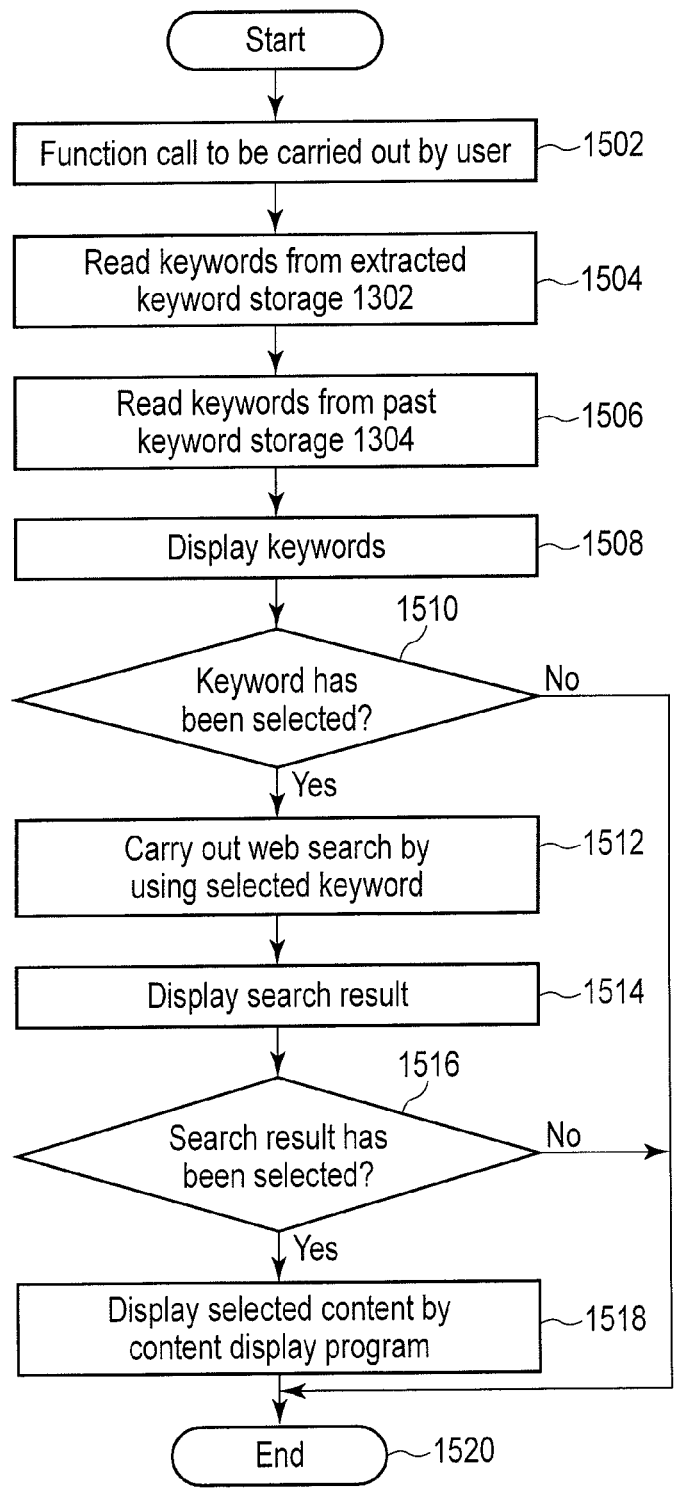
F I G. 15

1304

| Keyword | Extraction date/time | Search flag |
|---|---|---|
| Swimming | 2010/11/20 15:30 | true |
| Swimming race | 2010/11/20 15:30 | false |
| Butterfly | 2010/11/20 15:30 | false |
| Marathon | 2010/11/20 15:25 | false |
| Gold medal | 2010/11/20 15:25 | true |
| ⋮ | ⋮ | ⋮ |

FIG. 16

| Just extracted keyword | Search result |
|---|---|
| Football | |
| World Cup | |
| Japan | |
| Final | |
| Brazil | |
| Formerly extracted keyword | |
| Swimming 🔍 | |
| Swimming race | |
| Butterfly | |
| Marathon | |
| Gold medal 🔍 | |

FIG. 17

| Just extracted keyword | Search result: "Football" |
|---|---|
| Football | Japan through to World Cup final |
| World Cup | Japan national football team has earned its first ever place in the World Cup final, which is being held in this city... |
| Japan | http://news... |
| Final | What is football? |
| Brazil | A ball game played widely throughout the world. The birthplace of football is the United Kingdom. As an international sport that can be played with only one ball, ... |
| Formerly extracted keyword | http://word... |
| Swimming | Football Player Directory |
| Swimming race | Taro Shuukyuu (Birthplace: Osaka, Age: 25, Team: ... |
| Butterfly | http://players... |
| Marathon | Free kick was key to place in final |
| Gold medal | The winning goal came from a free kick... |
|  | http://scene... |

F I G. 18

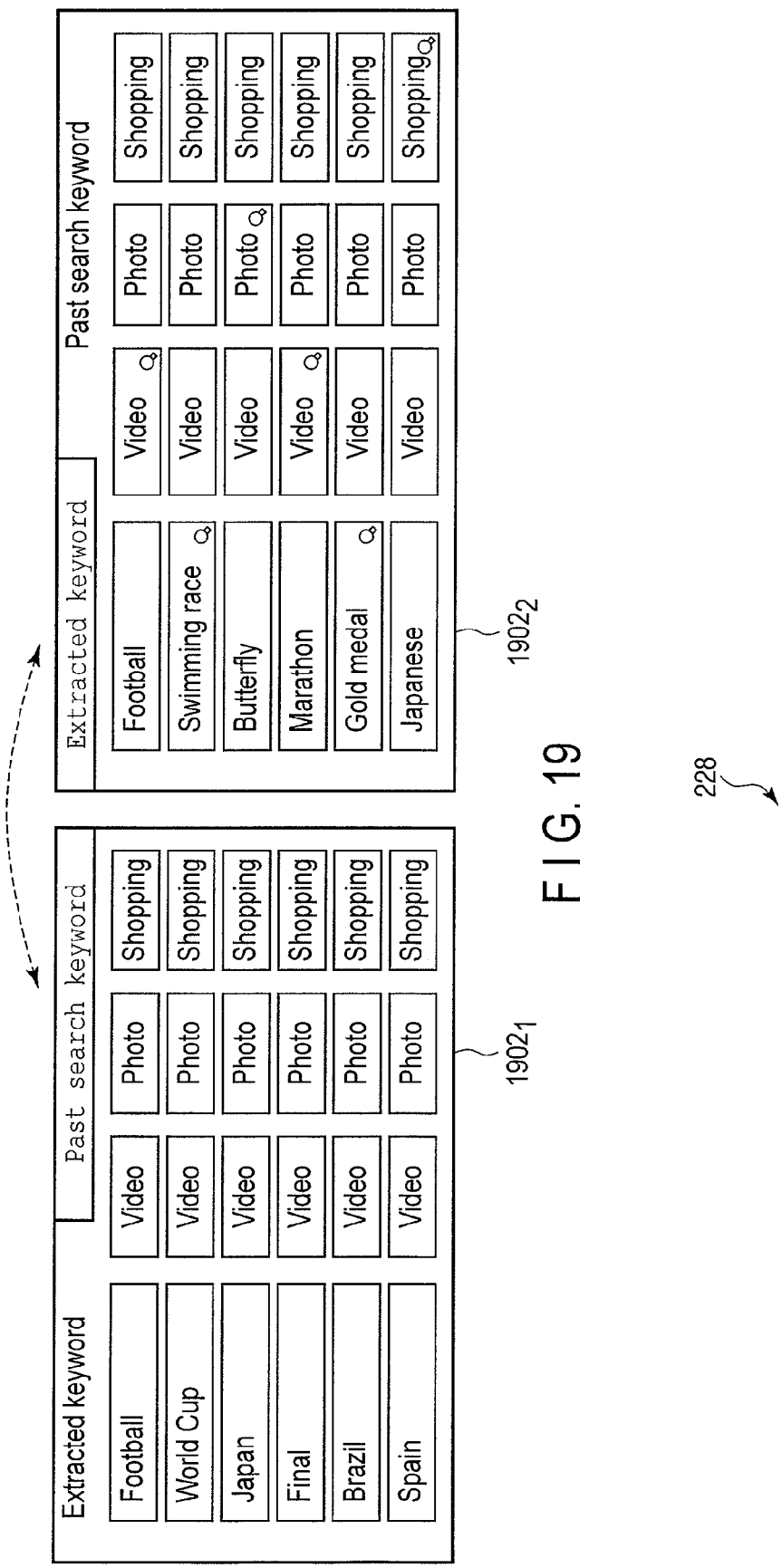

2110

| Date/time | Keyword | Search flag | Terminal |
|---|---|---|---|
| 2010/11/24 11:21:10 | Football | 0 | PC |
| 2010/11/24 11:21:10 | World Cup | 0 | PC |
| 2010/11/24 11:21:10 | Japan | 0 | PC |
| 2010/11/24 11:21:10 | Final | 0 | PC |
| 2010/11/24 11:21:10 | Brazil | 0 | PC |
| 2010/11/24 11:21:10 | Spain | 0 | PC |

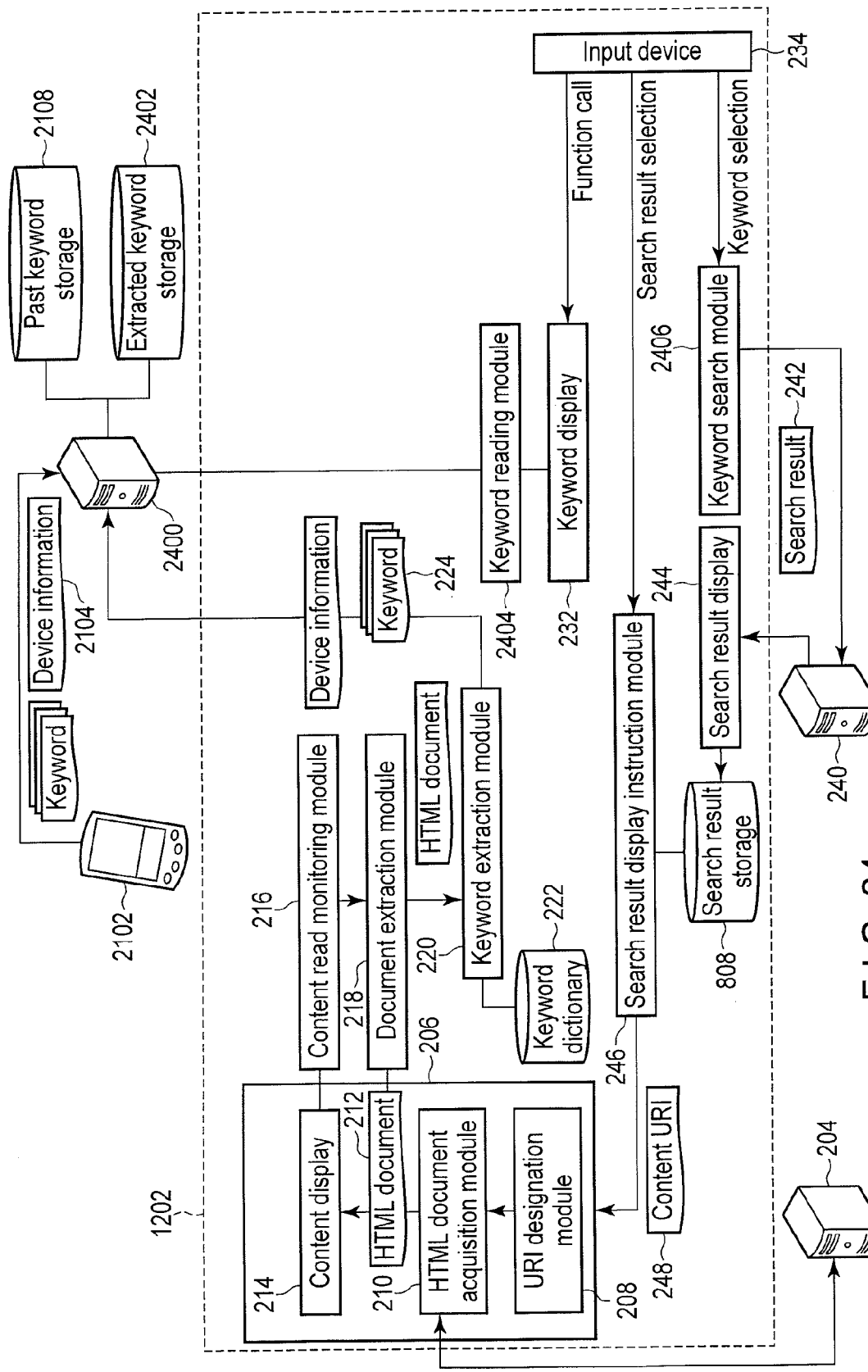
F I G. 24

2108

| Keyword | Extraction date/time | Search flag | Terminal |
|---|---|---|---|
| Swimming | 2010/11/20 15:30 | true | PC |
| Swimming race | 2010/11/20 14:10 | false | Mobile |
| Butterfly | 2010/11/20 14:10 | false | Mobile |
| Marathon | 2010/11/20 13:50 | false | PC |
| Gold medal | 2010/11/20 12:04 | true | Mobile |
| ⋮ | ⋮ | ⋮ | ⋮ |

FIG. 25

| Just extracted keyword | Search result |
|---|---|
| Football | |
| World Cup | |
| Japan | |
| Final | |
| Brazil | |
| Formerly extracted keyword | |
| Swimming | |
| Swimming race | |
| Butterfly | |
| Marathon | |
| Gold medal | |

| Date/time | Title | URI | Terminal |
|---|---|---|---|
| 2010/11/24 11:21:10 | Japan through to World Cup final | http://news... | PC |
| 2010/11/24 11:15:30 | What is football? | http://word... | PC |
| 2010/11/23 22:43:30 | Football Player Directory | http://players... | Mobile |
| 2010/11/23 22:38:45 | Free kick was key to place in final | http://scene... | Mobile |

F I G. 28

| Extracted keyword | Past keyword | Browsed URI |

Japan through to World Cup final
http://news...

What is football?
http://word...

Football Player Directory
http://players...

Free kick was key to place in final
http://scene...

F I G. 29

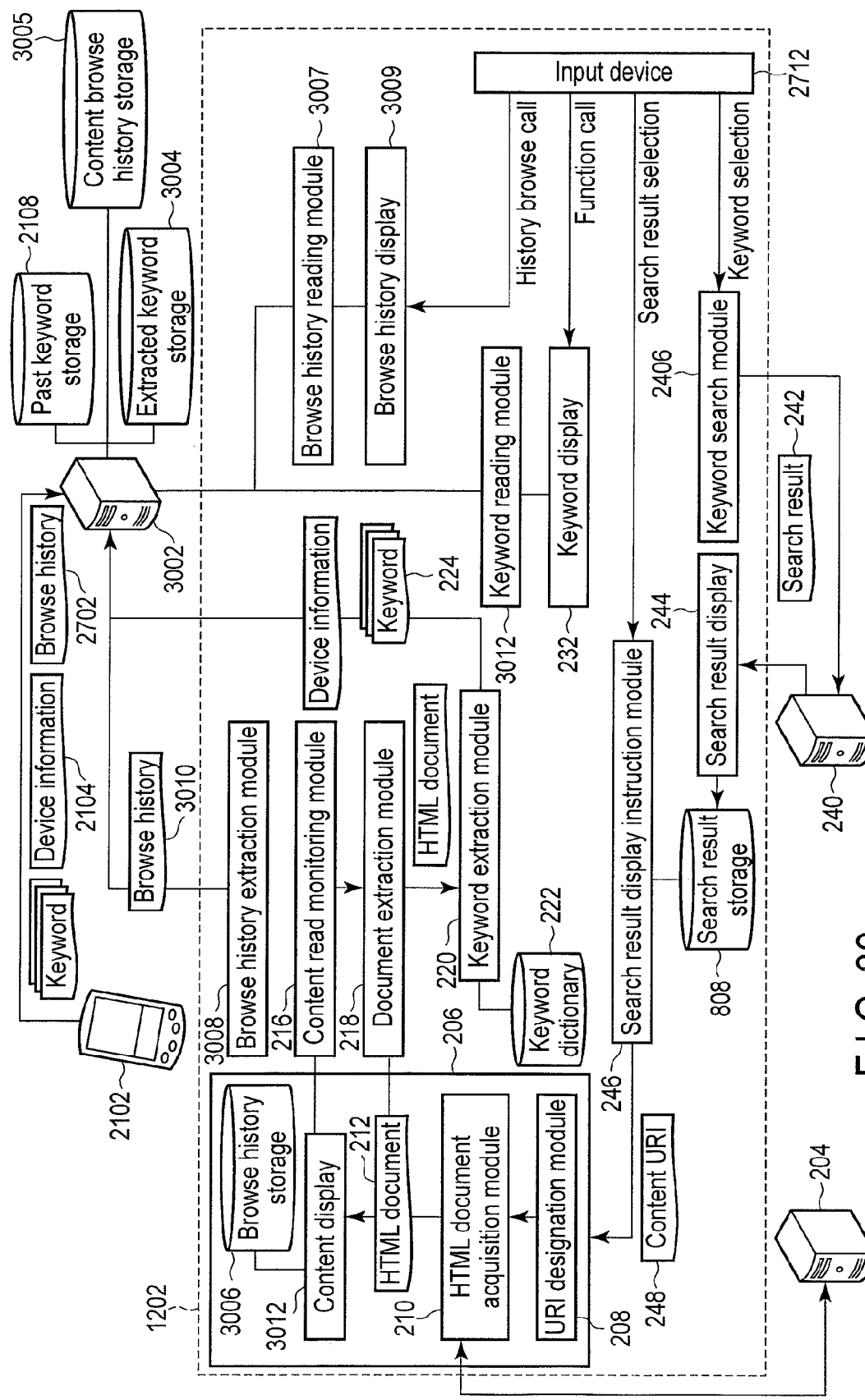
F I G. 30

FIG. 31

| Title | Snippet | Content URI | Browse date/time | Terminal |
|---|---|---|---|---|
| Japan through to World Cup final | Japan national football team has earned its first ever place in the World Cup final, which is being held in this city ... | http://news... | 2010/11/19 15:30 | PC |
| What is the butterfly? | The butterfly is one of the four basic swimming strokes. The name comes from the simultaneous motion of both arms in the water. | http://word... | 2010/11/19 14:05 | Mobile |
| Free kick was key to place in final | The winning goal was scored from a free kick ... | http://scene... | 2010/11/19 12:08 | PC |
| What is football? | A ball game played widely throughout the world. The birthplace of football is the United Kingdom. As an international sport that can be played with only one ball, ... | http://word... | 2010/11/19 12:05 | PC |

F I G. 32

| Just extracted keyword | Browse history |
|---|---|
| Football | Japan through to World Cup final |
| World Cup | Japan national football team has earned its first ever place in the World Cup final, which is being held in this city ... |
| Japan | http://news... |
| Final | What is the butterfly? |
| Brazil | The butterfly is one of the four basic swimming strokes. The name comes from the simultaneous motion of the both arms in the water. |
| Formerly extracted keyword | http://word... |
| Swimming | Free kick was key to place in final |
| Swimming race | The winning goal came from a free kick ... |
| Butterfly | http://scene... |
| Marathon | What is football? |
| | A ball game played widely throughout the world. The birthplace of football is the United Kingdom. As an international sport that can be played with only one ball, ... |
| | http://word... |

Browse history display

INFORMATION PROCESSING APPARATUS AND INFORMATION PROCESSING METHOD

CROSS-REFERENCE TO RELATED APPLICATIONS

This application is based upon and claims the benefit of priority from prior Japanese Patent Application No. 2011-042817, filed Feb. 28, 2011, the entire contents of which are incorporated herein by reference.

FIELD

Embodiments described herein relate generally to an information processing apparatus and information processing method which search for information.

BACKGROUND

A number of websites including one or plural web pages are connected to the Internet. An information processing apparatus connected to the Internet can provide a wide variety of information items to the user when the user accesses the web pages. The web page corresponds to a file described in Hypertext Markup Language (HTML). The web page is recognized by a uniform resource indicator (URI) or uniform resource locator (URL) (hereinafter referred to as a URI). A website is a collection of web pages. Access to a number of web pages is enabled, and hence it is difficult for a user of an information processing apparatus to find a valuable web page. Thus, processing is known, in which the user of the apparatus designates a remarkable term included in the web pages accessed by the user, on the other hand, the apparatus uses the designated term as a keyword, further extracts the keywords from character strings around the term, searches the web pages by designating the keywords, and accesses the retrieved web pages.

However, in order to cause the apparatus to search the web pages, it has been necessary for the user of the apparatus to select and designate the remarkable term. Accordingly, it has been inevitable that the meaning of the term must be deliberated, and an operation of correctly designating the selected term is required and, as a result of the above, there has been a problem that it is not possible to cause the apparatus to search the web pages easily.

In order to solve the above problem, a system for automatically extracting a keyword from a web page displayed by the information processing apparatus has been developed. The extracted keyword is displayed on the screen, and hence the user can carry out keyword searching by only selecting the displayed keyword.

Although a conventional information processing apparatus has been able to select any keyword from among keywords extracted from the web page currently displayed by the apparatus, the information processing apparatus has not been able to select a keyword from keywords extracted from a web page displayed in the past.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a view showing a typical example of external appearance of an information processing apparatus according to a first embodiment.

FIG. 8 is a block diagram showing the typical system configuration of an information processing apparatus according to a second embodiment.

FIG. 9 is a view showing an example of typical data items stored in an extracted keyword storage according to the second embodiment.

FIG. 10 is a view showing a typical example of a display screen configured to display keywords according to the second embodiment.

FIG. 11 is a view showing an example of typical data items stored in a past keyword storage according to the second embodiment.

FIG. 14 is a view showing an example of a typical flowchart showing a part of an information processing method according to the third embodiment.

FIG. 15 is a view showing an example of a typical flowchart showing another part of the information processing method according to the third embodiment.

FIG. 16 is a view showing an example of typical data items stored in an extracted keyword storage or a past keyword storage according to the third embodiment.

FIG. 17 is a view showing a typical example of a display screen configured to display keywords according to the third embodiment.

FIG. 18 is a view showing a typical example of a display screen of keywords and search results according to the third embodiment.

FIG. 19 is a view showing an example of a display screen configured to display keywords according to a fourth embodiment.

FIG. 20 is a view showing an example of typical data items stored in an extracted keyword storage or a past keyword storage according to the fourth embodiment.

FIG. 24 is a block diagram showing the typical system configuration of an information processing apparatus according to a sixth embodiment.

FIG. 25 is a view showing an example of typical data items stored in an extracted keyword storage or a past keyword storage according to the sixth embodiment.

FIG. 26 is a view showing a typical example of a display screen configured to display keywords according to the sixth embodiment.

FIG. 28 is a view showing an example of typical data items stored in a URI browse history storage according to the seventh embodiment.

FIG. 29 is a view showing a typical example of a display screen configured to display a browse URI according to the seventh embodiment.

FIG. 30 is a block diagram showing the typical system configuration of an information processing apparatus according to an eighth embodiment.

FIG. 31 is a view showing a typical example of a display screen configured to display keywords and browse history display button according to the eighth embodiment.

FIG. 32 is a view showing an example of typical data items stored in a content browse history storage according to the eighth embodiment.

FIG. 33 is a view showing a typical example of a display screen configured to display keywords, browse history display button, and browse history results according to the eighth embodiment.

DETAILED DESCRIPTION

Figure 2:
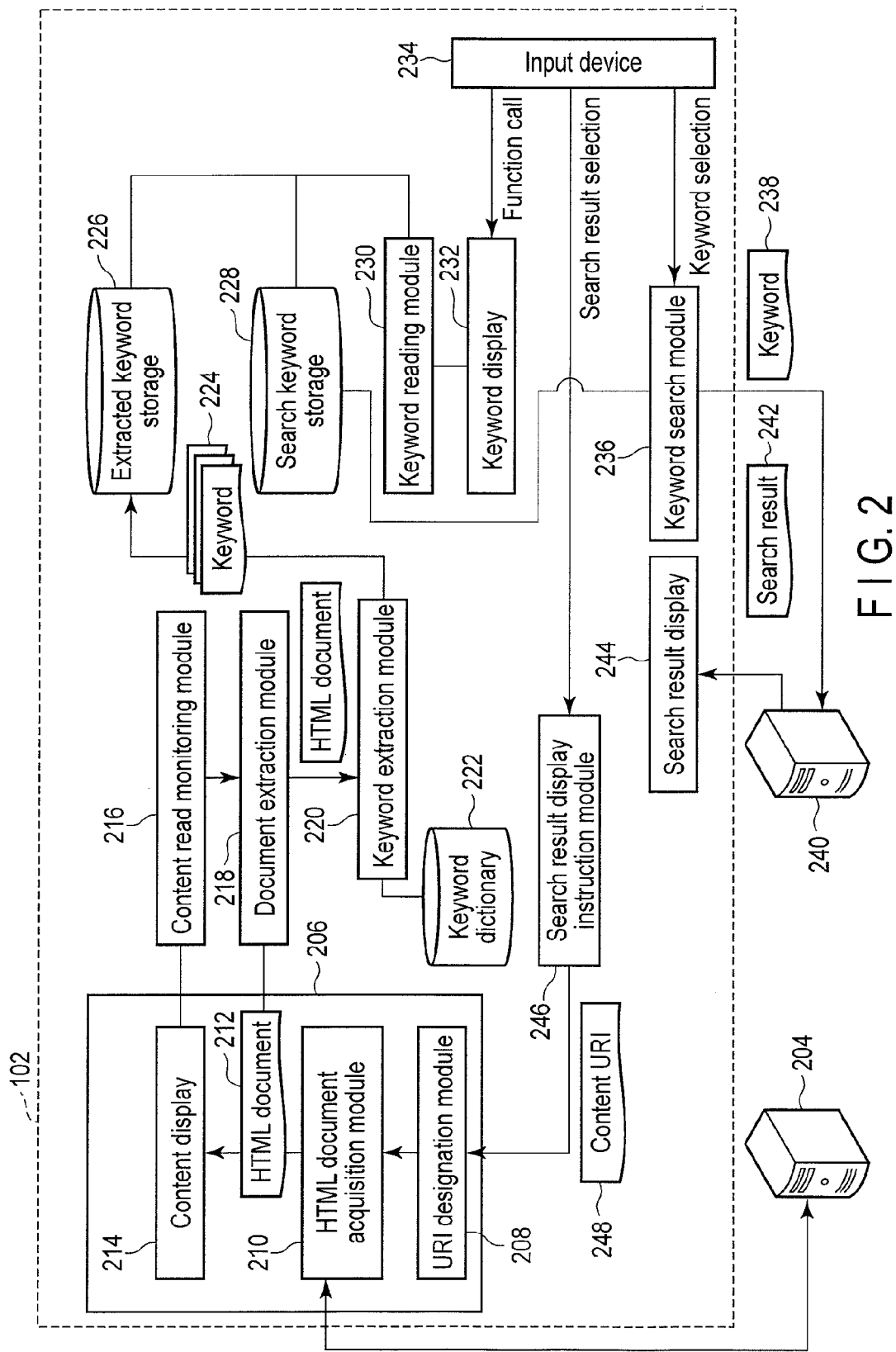
FIG. 2 is a block diagram showing the typical system configuration of the information processing apparatus according to the first embodiment.

Various embodiments will be described hereinafter with reference to the accompanying drawings.

In general, according to one embodiment, an information processing apparatus comprises a content display, an extraction module, a storage, and a keyword display. The content display is configured to display a content. The extraction module is configured to extract a keyword from the content displayed by the content display. The storage is configured to store a first keyword extracted by the extraction module. The keyword display is configured to display the first keyword extracted by the extraction module and a second keyword read from the storage.

FIG. 1 is a perspective view showing the external appearance of an information processing apparatus according to an embodiment. The information processing apparatus is realized as, for example, a notebook type computer 102. The computer 102 includes a computer main body 100, and display unit 101. A liquid-crystal display (LCD) 104 is incorporated in the display unit 101. The display unit 101 is attached to the computer main body 102 in such a manner that the unit 101 is freely rotatable between an opened position at which a top surface of the computer main body 102 is exposed, and closed position at which the top surface of the computer main body 102 is covered with the unit 101.

The computer main body 102 has a thin box-like housing and, on the top surface thereof, a keyboard 106, power button 110 configured to turn on/turn off the power of the computer 102, input operation panel 112, touch pad 108, speakers 114A and 114B, and the like are arranged. Various operation buttons are provided on the input operation panel 112.

The computer 102 is started when the power button 110 is turned on by the user. The started computer 102 is operated by an operation of the user in accordance with an input signal from an input interface such as a keyboard 106 or a touch pad 108. The computer 102 displays information on the LCD 104 in accordance with the input signal. For example, in the case where a web page is displayed on the LCD 104, when the user selects a link of the web page (hereinafter referred to as content) displayed on the LCD 104, the user can select the link displayed on the LCD 104 by using the input interface described above.

In the first embodiment, a content is displayed on the LCD 104, keywords are extracted from the content, the extracted keywords are stored, and keywords extracted from the currently displayed content, and stored keywords extracted from the contents displayed in the past are displayed on the LCD 104. Although details will be described later, describing the outline of the keyword display in the first embodiment, keywords extracted from the content are displayed on the LCD 104 at all times as a gadget. The keywords are displayed on the LCD 104 at all times, and hence, by only selecting any keyword from the displayed keywords, the user can carry out a search of the content on the basis of the selected keyword. However, the aspect of the display is not limited to the gadget, and the keywords may also be displayed by using an application on the LCD 104. For example, a keyword display button may be displayed at an end of the content display screen and, when the button is selected, the screen may be switched from the content display screen to a keyword display screen.

The content displayed on the LCD 104 is, for example, an HTML document acquired from the Internet, program-related information of TV, and text data and character strings such as metadata. The content is not limited to the above examples, and it is sufficient if the content is a content including text data and character strings which can be extracted by morphological analysis to be described later.

Even when keywords cannot be extracted from part of the content displayed on the LCD 104, it is sufficient if a content from which keywords can be extracted is included in part of the content displayed on the LCD 104.

The processing of the first embodiment to be carried out by the above-mentioned computer 102 will be described below with reference to FIGS. 2 and 3.

First, the configuration of the processing system including the computer 102 will be described with reference to FIG. 2. FIG. 2 is a block diagram showing the system configuration of the first embodiment.

The processing system of the first embodiment includes the computer 102, a content providing server 204, and keyword search server 240. Each of the content providing server 204 and keyword search server 240 is, for example, a server which can be accessed through an IP network such as the Internet. However, the content providing server 204 and keyword search server 240 are not indispensable. If the computer 102 includes a function equivalent to such servers, it is not necessary to provide the content providing server 204 and keyword search server 240. That is, a system in which contents stored in the computer 102 itself are searched for on the basis of keywords extracted by a keyword extraction function owned by the computer 102 itself may be employed.

In the computer 102, a URI is designated by the user by using an input interface such as the keyboard 106 or the touch pad 108 and, on the basis of the designated URI, the computer 102 is connected to the content providing server 204 through a URI designation module 208 realized by a content display program 206. The computer 102 acquires, from the content providing server 204, an HTML document 212 corresponding to the URI designated by an HTML document acquisition module 210 realized by the content display program 206.

The HTML document acquisition module 210 sends the HTML document 212 acquired from the content providing server 204 to a content display 214 connected to a content read monitoring module 216.

The content display 214 interprets the HTML document 212 sent from the HTML document acquisition module 210, and displays a content based on the interpreted HTML document 212 on the LCD 104. The content read monitoring module 216 monitors the progress of the display of the content displayed by the content display 214. Upon confirming that the display of whole of the content to be displayed has been completed, the content read monitoring module 216 notifies a document extraction module 218 connected to a keyword extraction module 220 of the fact.

Upon receipt of the notification, the document extraction module 218 acquires the HTML document 212 from the HTML document acquisition module 210, and sends the HTML document 212 to the keyword extraction module 220 connected to a keyword dictionary 222 and extracted keyword storage 226.

The keyword extraction module 220 extracts keywords from the HTML document 212 sent from the document extraction module 218 by using the keyword dictionary 222. The keyword extraction module 220 stores the extracted keywords 224 in the extracted keyword storage 226. A keyword reading module 230 reads the keywords from the extracted keyword storage 226. A keyword display 232 displays the keywords 224 read by the keyword reading module 230 on the LCD 104.

When any one of the keywords 238 displayed by the keyword display 232 is selected by the user from an input device 234 configured to receive a signal input from the input interface such as the keyboard 106 or the touch pad 108 by an operation of the user, the fact is notified to a keyword search module 236.

The keyword search module 236 sends the keyword 238 selected by the user to a search keyword storage 228 to cause the keyword 238 to be stored in the section 228, and also sends the keyword 238 to the keyword search server 240.

A search result display 244 is connected to the keyword search module 236 through the keyword search server 240, and receives a search result 242 of the keyword search to be carried out by the keyword search server 240. On the basis of the received search result 242, the search result display 244 displays a search result obtained by using the keyword 238 selected by the user on the LCD 104.

The search result indicates contents including the keyword, and includes a title of the web page, snippet, URI of the contents, and the like. When any one of the contents is selected by the user, the input device 234 notifies a search result display instruction module 246 connected to the URI designation module 208 of the fact. The search result display instruction module 246 sends a content URI 248 in the search result displayed by the search result display 244 to the URI designation module 208 in accordance with the notification.

The processing method of the first embodiment will be described below in detail with reference to the flowchart shown in FIG. 3.

A content display program 206 is an application configured to display an HTML document such as the web browser. It is also sufficient if the content display program 206 is a program which can display an HTML document other than the web browser, and acquired from the Internet. In addition to the HTML document, the content item to be displayed by the content display program 206 may be a document which can be displayed by the web browser or the like described in a language that can extract a keyword.

In block 302, the HTML document acquisition module 210 acquires the HTML document 212 from the content providing server 204 on the Internet on the basis of the URI from the URI designation module 208 which has received the URI input information from the input interface such as the keyboard 106 or the touch pad 108 by the operation of the user.

In block 304, the content display 214 interprets the HTML document 212 from the HTML document acquisition module 210, and displays a content based on the interpreted HTML document 212 on the web browser of the LCD 104.

In block 306, the content read monitoring module 216 monitors the progress of the display of the content displayed by the content display 214. When the content to be displayed by the content display 214 has completely been displayed, the content read monitoring module 216 notifies the document extraction module 218 of the fact (completion of display of the content) in block 308.

In block 310, upon receipt of the completion of display of the contents, the document extraction module 218 extracts an HTML document of the contents displayed by the content display 214. The document extraction module 218 sends the extracted HTML document 212 to the keyword extraction module 220.

In block 312, the keyword extraction module 220 analyzes the HTML document 212 sent thereto from the document extraction module 218, and extracts characteristic keywords. More specifically, the keyword extraction module 220 extracts the text of the part of the HTML document 212 corresponding to the text of the content. The keyword extraction module 220 subjects the extracted text to morphological analysis by using the keyword dictionary 22 to extract keywords. For example, on the basis of a word contained in the keyword dictionary 222, the keyword extraction module 220 decomposes the text which is a natural sentence into morphemes each of which is a minimum unit having a meaning as a language.

In the keyword dictionary 222, for example, a word that can distinguish parts of speech of the morphemes is stored. Each of the morphemes of the text decomposed by the morphological analysis becomes an extracted keyword. The extracted keywords are arranged in, for example, descending order of score. The score indicates, for example, the degree of appearance frequency of an extracted keyword. As the method of arranging the keywords other than the method of arranging the keyword in descending order of score, a method of arranging the keywords in ascending order of score may be employed. Further, the extracted keywords may be arranged regardless of the score without rearranging the extracted keywords.

Figures 4, 5:
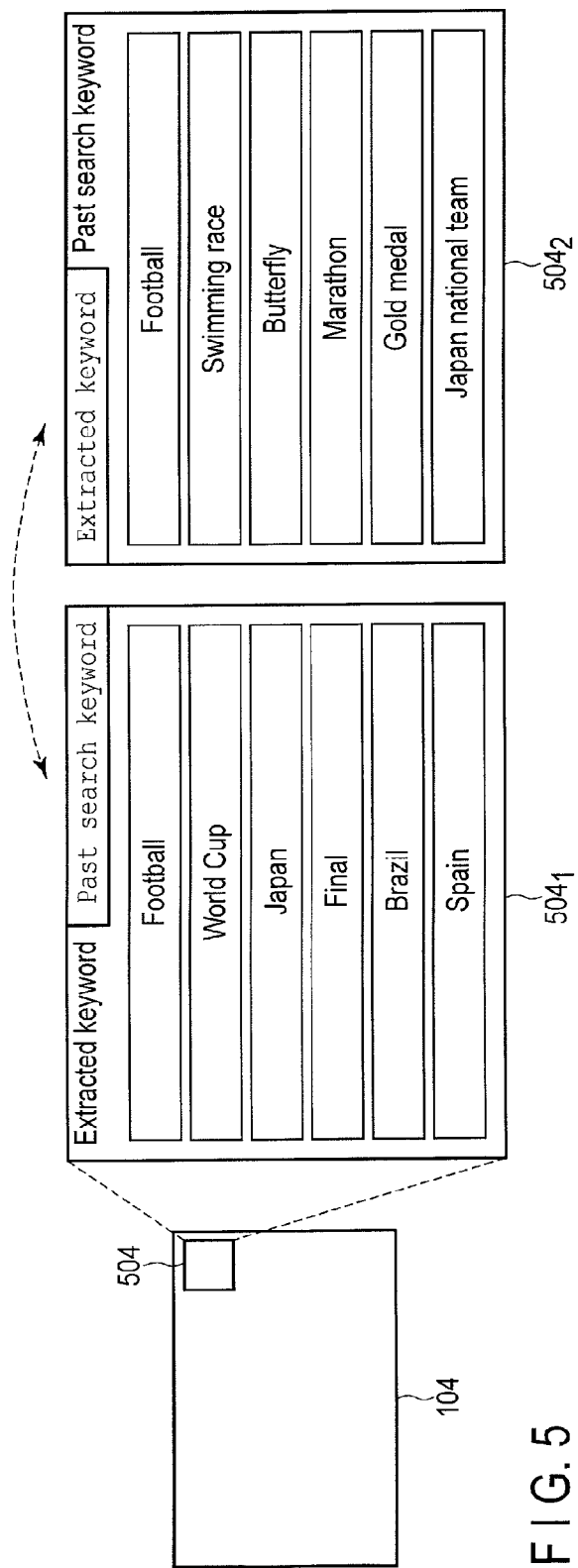
FIG. 4 is a view showing an example of typical data items stored in an extracted keyword storage according to the first embodiment.
FIG. 5 is a view showing a typical example of a display screen configured to display keywords according to the first embodiment.

In block 314, the keywords 224 extracted by the morphological analysis, and rearranged in order of, for example, score are stored in the extracted keyword storage 226. More specifically, as shown in FIG. 4, the extracted keywords 224, and dates and times are stored in the extracted keyword storage 226.

The date and time indicate the date/time on/at which the keyword 224 has been extracted, and the keywords 224 are arranged in descending order from above. In FIG. 4, the keyword having, for example, the highest score is "football", and keyword having the second highest score is "World Cup". Six keywords are shown in FIG. 4, and it is understood that the keywords have been extracted at the same time. It should be noted that the number of the keywords to be stored in the extracted keyword storage 226 is not limited to six. For example, when the number of keywords extracted from the text is n, the n keywords which are all the extracted keywords may be stored in the extracted keyword storage 226 or some upper keywords among keywords each having a high score may be stored by setting an upper limit number of keywords to be stored. Further, the dates and times of the extracted keywords may differ from each other. Person's names, placenames, and the like indicating categories of keywords may be included in the keywords to be stored in the extracted keyword storage 226 as attribute information. Hereinafter, a keyword including attribute information is also referred to as the keyword.

In block 316, the keyword reading module 230 monitors the progress of storing of keywords to the extracted keyword storage 226. When the storing of keywords to the extracted keyword storage 226 has been completed, the keyword reading module 230 reads the extracted keywords from the extracted keyword storage 226 in block 318.

The keyword reading module 230 reads keywords also from the search keyword storage 228. The keyword reading module 230 hands the keywords read from the extracted keyword storage 226 and search keyword storage 228 over to the keyword display 232.

In block 320, the keyword display displays the keywords received from the keyword reading module 230. The keywords include keywords read from both the extracted keyword storage 226 and search keyword storage 228.

An example of a display screen to be displayed by the keyword display 232 will be described below by referring to FIG. 5.

FIG. 5 is a view showing a display screen example of keywords to be displayed on the LCD 104 of the first embodiment.

Keywords are displayed on the display screen of the LCD 104 as, for example, a gadget 504. The specific display screen to be displayed in the gadget 504 includes an extracted keyword display screen $504_1$ and past search keyword display screen $504_2$.

The extracted keyword display screen $504_1$ and past search keyword display screen $504_2$ are switched to/from each other by a tab indicated at an upper part of each of them, and one selected screen is displayed. The tab includes two tabs of "extracted keyword", and "past search keyword". The keywords to be displayed on the extracted keyword display screen $504_1$ and past search keyword display screen $504_2$ are displayed as labels of buttons.

More specifically, on the extracted keyword display screen $504_1$, extracted keywords read from the extracted keyword storage 226 are displayed. The keywords to be displayed may be rearranged on the basis of the aforementioned scores or may be arranged in extraction date/time order.

On the past search keyword display screen $504_2$, past search keywords read from the search keyword storage 228 are displayed. Although details will be described later by referring to FIG. 6 (contents of the search keyword storage 228), regarding the order of the keywords to be displayed, a display method in which, for example, the dates/times on/at which keywords have been retrieved are displayed in descending order, i.e., the most recent past search keyword is displayed at the top of the keywords may be employed. Furthermore, on the past search keyword display screen $504_2$ too, the past search keywords rearranged on the basis of the aforementioned scores may be displayed.

In block 322, when the user selects a button of any one of keywords displayed on the extracted keyword display screen $504_1$ or on the past search keyword display screen $504_2$ by using the input interface described previously, the input device 234 receives the notification of the fact. For example, when "football" which is an extracted keyword displayed on the extracted keyword display screen $504_1$ is selected by using the keyboard 106, the input device receives an input signal thereof. A standby state is kept until the next web page is read.

In block 324, and block 326, the input device 234 notifies the keyword search module 236 of the keyword selected by the user. The keyword search module 236 issues a search query configured to search for information associated with the keyword "football" to, for example, the keyword search server 240 on the Internet. The keyword search server 240 may not necessarily be on the Internet. For example, when software equivalent to the server 240 capable of searching for information associated with the keyword is included in the personal computer 202, the software may be used. Furthermore, a keyword search server existing on a local network may also be used. In FIG. 2, although issuance of a search query of one keyword 238 is assumed, when plural keywords are selected by the user, plural search queries may also be issued. Furthermore, in block 326, the keyword search server 240 searches for information associated with the keyword "football" on the basis of the search query.

In block 328, the keyword search module 236 stores the keyword 238 used for the search in the search keyword storage 228 as a past search keyword.

Figures 6, 7:
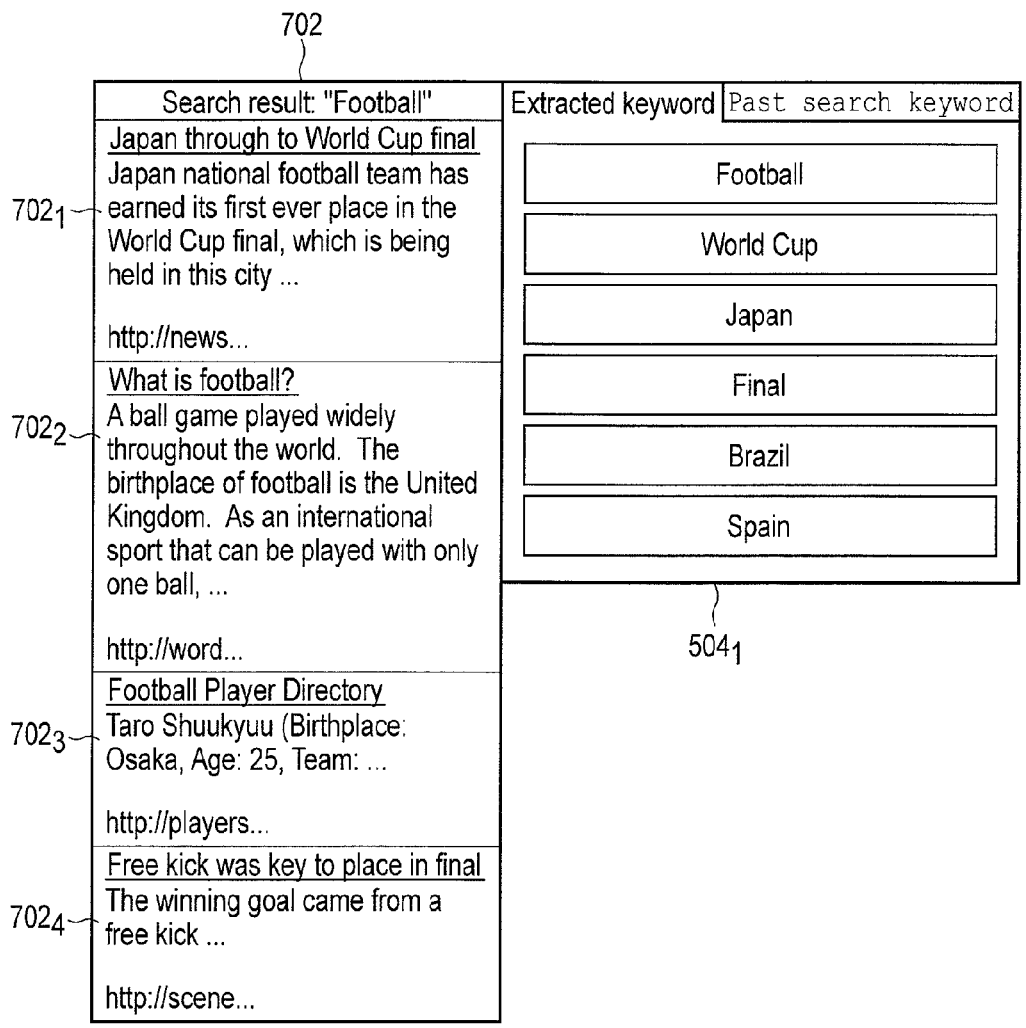
FIG. 6 is a view showing an example of typical data items stored in a search keyword storage according to the first embodiment.
FIG. 7 is a view showing a typical example of a display screen of keywords and search results according to the first embodiment.

FIG. 6 is an example of data to be stored in the search keyword storage 228.

As shown in FIG. 6, data to be stored in the search keyword storage 228 includes a date/time and keyword as in the case of FIG. 4. Regarding the date/time, unlike the keyword to be stored in the extracted keyword storage 226, not the extraction date/time, but date/time on/at which search has been carried out by using the keyword is stored. Accordingly, "football" and "swimming race" which are the past search keywords differ from each other in search date/time. The date/time may not be the search date/time, and may also be the time at which the user has selected the keyword. As shown in FIG. 6, the most recent keyword which has been used for the search may be arranged at the top of the data items or the most recent keyword may also be arranged at the lowest position.

The past search keyword display screen $504_2$ shown in FIG. 5 will be described below in detail. On the past search keyword display screen $504_2$, the past search keywords stored in the search keyword storage 228 are displayed. In FIG. 6, although it is shown that two keywords are stored in the search keyword storage 228, two or more keywords may be stored therein. FIG. 5 shows that six past search keywords are stored. The "past search keyword" which is a tab shown at an upper part of each of the extracted keyword display screen $504_1$ and past search keyword display screen $504_2$ implies that the display screen displays keywords used in the past search, and stored in the search keyword storage 228.

In block 330, a search result 242 of information associated with the keyword 238 retrieved by the keyword search server 240 is sent to the search result display 244 on the basis of the search query issued by the keyword search module 236. The search result display 244 displays the search result screen 702 based on the search result 242.

A display example of the search result screen 702 displayed by the search result display 244 is shown in FIG. 7.

In FIG. 7, the search result screen 702 is displayed on the left of the extracted keyword display screen $504_1$ or the past search keyword display screen $504_2$ as a gadget. However, the search result screen 702 may be displayed by using an application such as the web browser displayed on the LCD 104 besides the display by the gadget. The search result screen 702 may not necessarily be displayed on the left of the extracted keyword display screen $504_1$ or the past search keyword display screen $504_2$, and may also be displayed at an arbitrary position on the LCD 104. On the search result screen 702 of FIG. 7, although information on four search result items $702_i$ (i=1 to 4) associated with "football" which is the selected keyword is displayed, the number of items is not necessarily be limited to four. The search result items $702_i$ of the search result 702 include a title, snippet, and URI. The order of display of the search result items is not particularly limited, and the items may be displayed in arbitrary order.

In block 332, when the user has selected any one of the search result items $702_i$ on the search result screen 702, the input device 234 receives an input signal from the user in block 334, and further notifies the search result display instruction module 246 of the fact that a search result item $702_i$ has been selected. When the user has not selected any one of the search result items $702_i$ of the search result screen 702, the processing is returned to block 322, and any one of the keywords shown on the extracted keyword display screen $504_1$ or the past search keyword display screen $504_2$ is waited for to be selected by the user for a certain period. When the other keyword has been selected in block 322, search using the selected keyword is carried out (block 326), and the display screen of FIG. 7 is changed simultaneously (block 330).

In block 334, the search result display instruction module 246 notifies a content URI 248 (see the search result items $702_i$ of FIG. 7) corresponding to the search result selected by the user to the URI designation module 208. The URI designation module 208 tells the HTML document acquisition module 210 to acquire the HTML document of the designated URI from the content providing server 204 as described previously.

As described above, according to the first embodiment, when the user carries out a keyword search, necessary processing can be automatically carried out. For example, in the conventional method, although the keyword search has been carried out by a user operation of copying the search keyword from the displayed document into the search box, keywords automatically extracted from the displayed content are displayed in the gadget at all times, and hence it becomes possible to search for information associated with the displayed contents by only selecting a keyword from the displayed keywords without the need for troublesome operations of inputting a keyword, copying a keyword, and the like. The keywords are displayed as a gadget, and hence the display screen of the content is not obstructed by the keywords, whereby the content browsing practice of the user is not hindered. The keywords are displayed as a gadget, and hence the keywords naturally come into view, the user is interested by a keyword which is not used by the user when the user carries out a search by himself or by herself, and the user carries out a search in such a state, whereby it becomes possible for the user to widen the range of information to be acquired by the user. In addition to the keywords extracted from the currently browsed content, keywords which have been used for a search in the past are also displayed, whereby it becomes possible to carry out search again with respect to a keyword which has been used for a search in the past even when the content including the keywords is not currently browsed.

Other embodiments will be described below. In the description of the other embodiments, parts corresponding to those of the first embodiment are denoted by the same reference numerals, and the detailed description of them is omitted.

Next, a second embodiment will be described below.

In the first embodiment, the extracted keywords are stored in the extracted keyword storage 226, and the past search keywords which have actually been used for a search are stored in the search keyword storage 228 from among the extracted keywords read from the extracted keyword storage 226. In the second embodiment, although the extracted keywords are stored in the extracted keyword storage 226 in the same manner as the first embodiment, all the extracted keywords read from the extracted keyword storage 226 are stored in a past keyword storage. Parts of the second embodiment other than this point are identical with the first embodiment.

The configuration of the processing system including a computer 102 of the second embodiment will be specifically described below with reference to FIG. 8.

A past keyword storage 804 is connected to the keyword extraction module 220, extracted keyword storage 802, and keyword reading module 801. The keyword extraction module 220 confirms whether to not data is stored in the extracted keyword storage 802. Here, the data includes at least a keyword. Although details will be described later, for example, the data also includes the date/time on/at which the keyword has been extracted, and search information indicating whether or not which keyword of the extracted keywords has been used for a search. When the data is stored in the extracted keyword storage 802, the keyword extraction module 220 copies the data into the past keyword storage 804, and deletes the data of the extracted keyword storage 802. After that, the keyword extraction module 220 carries out the morphological analysis of the HTML document 212 sent from the document extraction module 218, and extracts the keywords 224. The extracted keywords are stored in the extracted keyword storage 802.

Data to be stored in the extracted keyword storage 802 will be described below with reference to FIG. 9. FIG. 9 is an example of data to be stored in the extracted keyword storage 802 in the second embodiment. The data includes, from the left row, the date/time on/at which a keyword has been extracted, extracted keyword, and search flag indicating whether or not the keyword has been used for a search. The date/time and keyword are identical with the first embodiment. The search flag indicates, with respect to a certain keyword, whether or not the keyword has actually been used for a search. For example, when a keyword "football" has been used for a search, the search flag of football is made 1. Further, at the point at which a keyword is sent from the keyword extraction module 220, the search flag of each keyword is 0 as shown in FIG. 9. However, at the point at which the keyword is sent from the keyword extraction module 220, the search flag of each keyword may also be 1. Furthermore, the search flag is not limited to 0 or 1, and may be anything by which it can be known whether or not the keyword has been used for a search. Although data items to be stored in the extracted keyword storage 802 may have no search flag, here, for convenience of enabling both the extracted keyword storage 802, and past keyword storage 804 to store data of the same format, search flags are provided.

FIG. 11 is a view showing an example of data to be stored in the past keyword storage 804 in the second embodiment. The data includes, from the left row, the date/time, keyword, and search flag. The date/time, and search flag are each given the same definition as FIG. 9. FIG. 11 shows that a keyword, football has been extracted on/at different dates/times, the keyword "football" in the first line is a keyword (search flag thereof is 1) which has been used for a search, and keyword "football" in the third line is a keyword (search flag thereof is 0) which has been extracted, but has not been used for a search.

Returning to FIG. 8, a keyword display 805 is connected to the extracted keyword storage 802 and past keyword storage 804 through a keyword reading module 801. The keyword display 805 displays information based on data read by the keyword reading module 801 from the extracted keyword storage 802 and past keyword storage 804, and shown in FIG. 9, and FIG. 11 on the LCD 104. The display method is identical with the first embodiment. However, unlike the first embodiment, a past keyword display screen $504_3$ shown in FIG. 10 is displayed in a gadget 504 in place of the past search keyword display screen $504_2$.

FIG. 10 is an example showing the past keyword display screen $504_3$ configured to display keywords extracted in the past, and displayed by the keyword display 805 in the second embodiment in the gadget 504. Like the first embodiment, the extracted keyword display screen, and past keyword display screen can be switched to/from each other by using the tab. In the second embodiment, search marks (shown as magnifying glasses in FIG. 10) each of which indicates that the keyword has been used for a search are displayed together with keyword buttons corresponding to keywords each of which has a search flag of 1, i.e., keywords that have been used for a search. In FIG. 10, search marks are shown on the right side of buttons of keywords "football" and "swimming race". It should be noted that any mark that makes it possible to know that the keyword has been used for a search may be used as the search mark.

Returning to FIG. 8 again, when any one of the keywords displayed in the gadget 504 has been selected by the user, a keyword search module 806 issues a search query of the keyword selected by the user to the keyword search server 240, and issues an instruction to make the search flag of the keyword selected by the user 1 to the extracted keyword storage 802.

As described above, according to the second embodiment, in addition to the extracted keywords, not only the keywords that have been used for a search in the past, but also the keywords which have not been used for a search, but have been extracted from the content browsed in the past are displayed as the past keywords, and hence it becomes possible to also carry out search using the keyword which the user has not used heretofore for a search, and it also becomes possible to carry out search with respect to a keyword in which the user has not been interested in the past.

Next, a third embodiment will be described below. Description of the same configurations and functions as the above-mentioned embodiments will be omitted.

Figure 12:
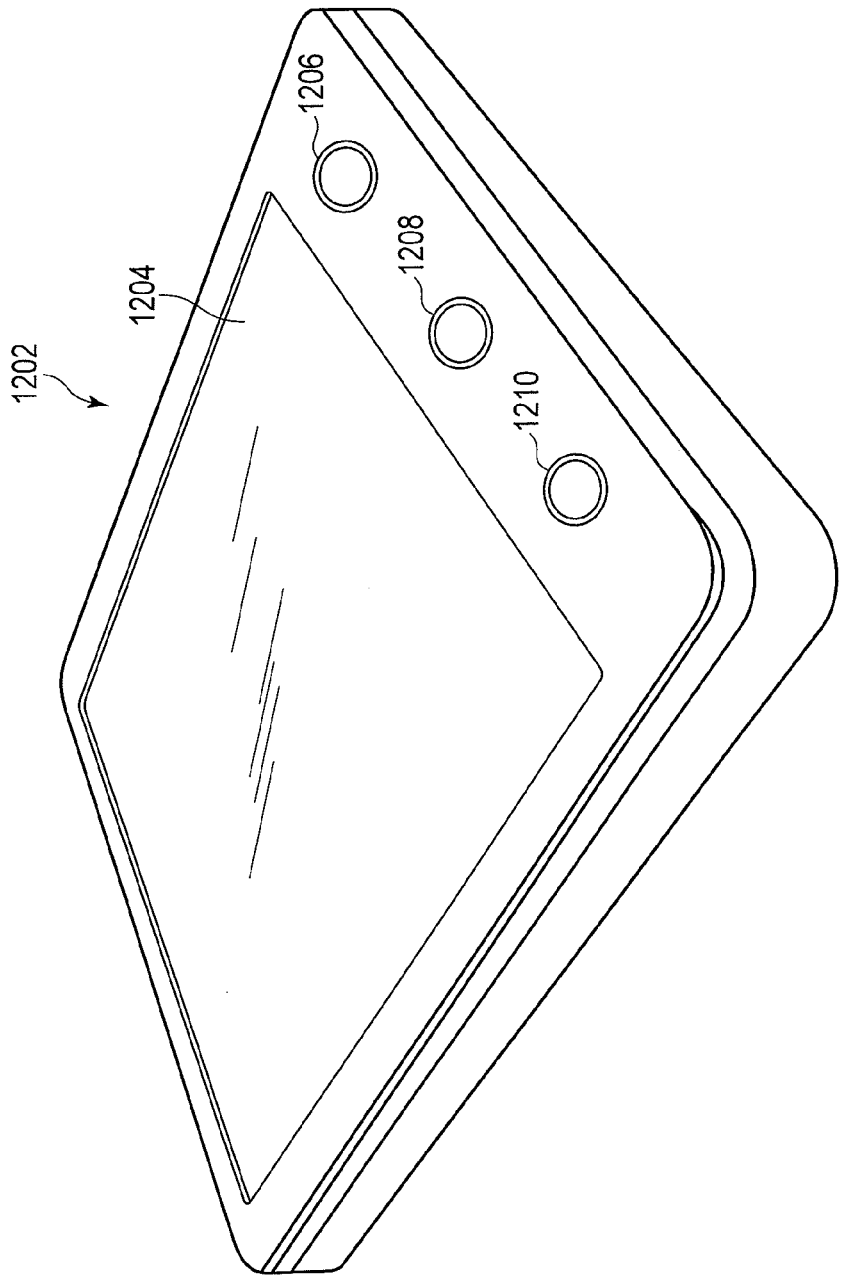
FIG. 12 is a view showing a typical example of external appearance of an information processing apparatus according to a third embodiment.

In the third embodiment, unlike the first and second embodiments, the information processing apparatus is implemented as a slate type PC 1202 shown in FIG. 12. The third embodiment differs from the above-mentioned embodiments in the display form of the keyword. Regarding other items, the third embodiment is identical with the first and second embodiments.

FIG. 12 is a view showing an example of external appearance of an information processing terminal in the third embodiment. The slate type PC 1202 includes a monitor 1204, and plural, for example, three operation switches 1206, 1207, and 1210. Any one of the operation switches 1206, 1207, and 1210 may be provided not as hardware, and may be displayed on the application. The number of the operation switches is not limited to three.

Figure 13:
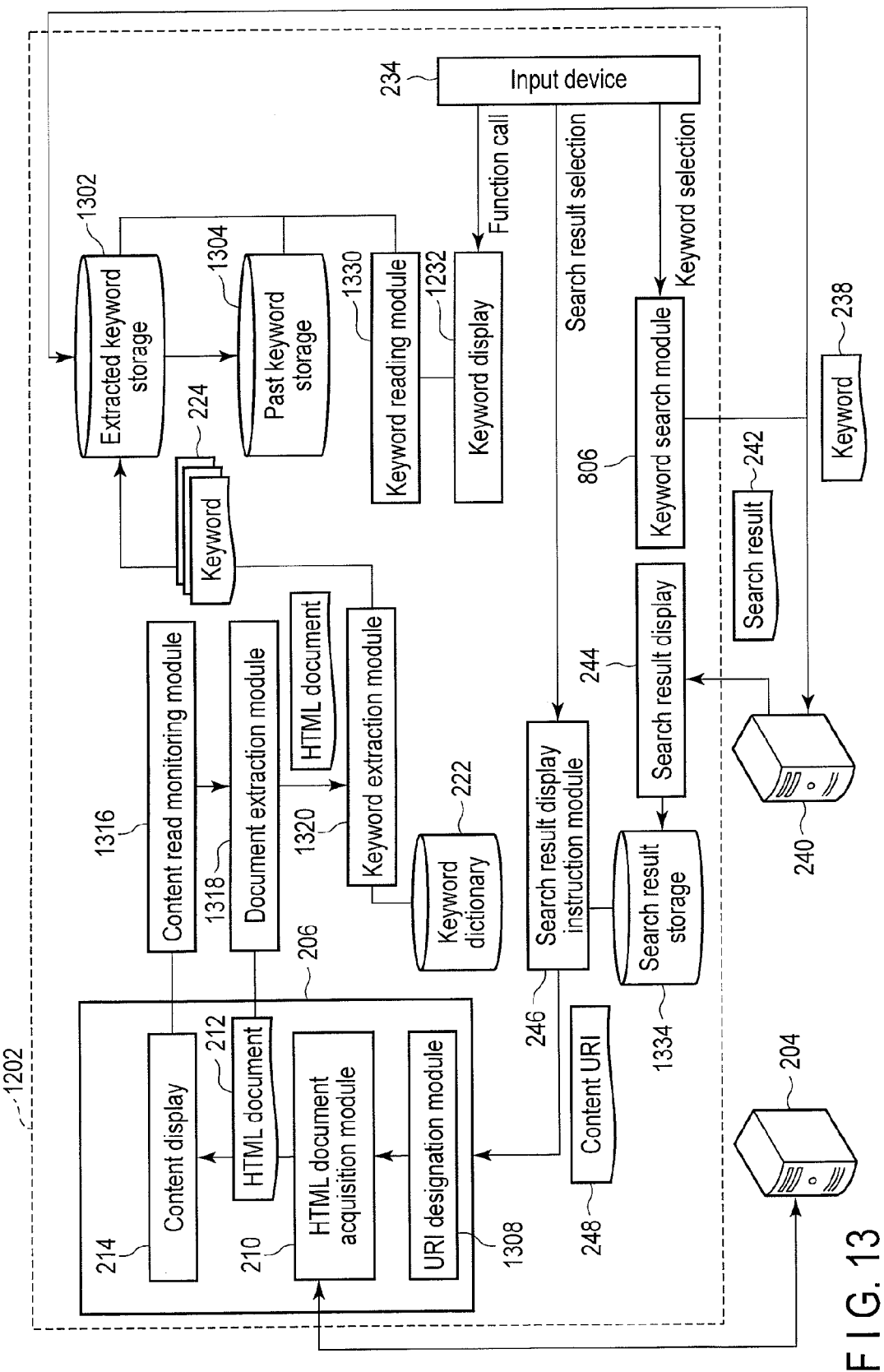
FIG. 13 is a block diagram showing the typical system configuration of the information processing apparatus according to the third embodiment.

The configuration of the processing system of the third embodiment will be described below with reference to FIG. 13. FIG. 13 is a block diagram showing the system configuration of the third embodiment including the slate type PC 1202. The user uses the operation switches 1206, 1207 or 1210, or touches the monitor 1204 by his or her finger, whereby the user designates a URI of the contents to be displayed on the monitor 1204, and a URI designation module 1308 receives the designated URI. For example, the user clicks character input to an address bar of a web browser displayed on the monitor 1204 or a link of the hypertext, whereby a URI is designated, and the URI designation module 1308 receives the URI.

Although a content read monitoring module 1316 monitors the progress of display of the contents displayed by the content display 214, completion of the display of all the contents based on the HTML document 212 sent from the HTML document acquisition module 210 may also be monitored by the plug-in of the web browser. Likewise, regarding the means for extraction of the HTML document to be carried out by the document extraction module 1318, the plug-in of the web browser may also be used.

In the aforementioned embodiments, although the extracted keyword storages 226 and 802 are overwritten with the extracted keywords, and the previous extracted keywords are deleted. In the third embodiment, the keywords stored in the extracted keyword storage 1302 are not deleted, and the stored data in the extracted keyword storage 1302 is copied into the past keyword storage 1304 before the keywords 224 sent from a keyword extraction module 1320 are written to the extracted keyword storage 1302. The information to be stored in a search result storage 1334 is based on the search result 242 of the searched keywords displayed by the search result display 244 and includes a title of a web page, snippet, and URI of the contents displayed by the content display program 206.

The keywords to be stored in the past keyword storage 1304 are actually included in the data table shown in FIG. 16.

FIG. 16 shows, from the left row, a keyword, date/time on/at which the keyword has been extracted, and search flag. Regarding the search flag, in place of 0 or 1 which has been described in the second embodiment, false or true is used. Keywords different from each other in the extraction date/time are stored in the same data table. Although the extraction dates/times are shown in descending order, they may also be stored in the data table in ascending order. Data items to be stored in the extracted keyword storage 1302 are also arranged in the same manner as that in FIG. 16.

The processing method of the third embodiment will be described below with reference to the flowcharts of FIG. 14 and FIG. 15.

Figure 3:
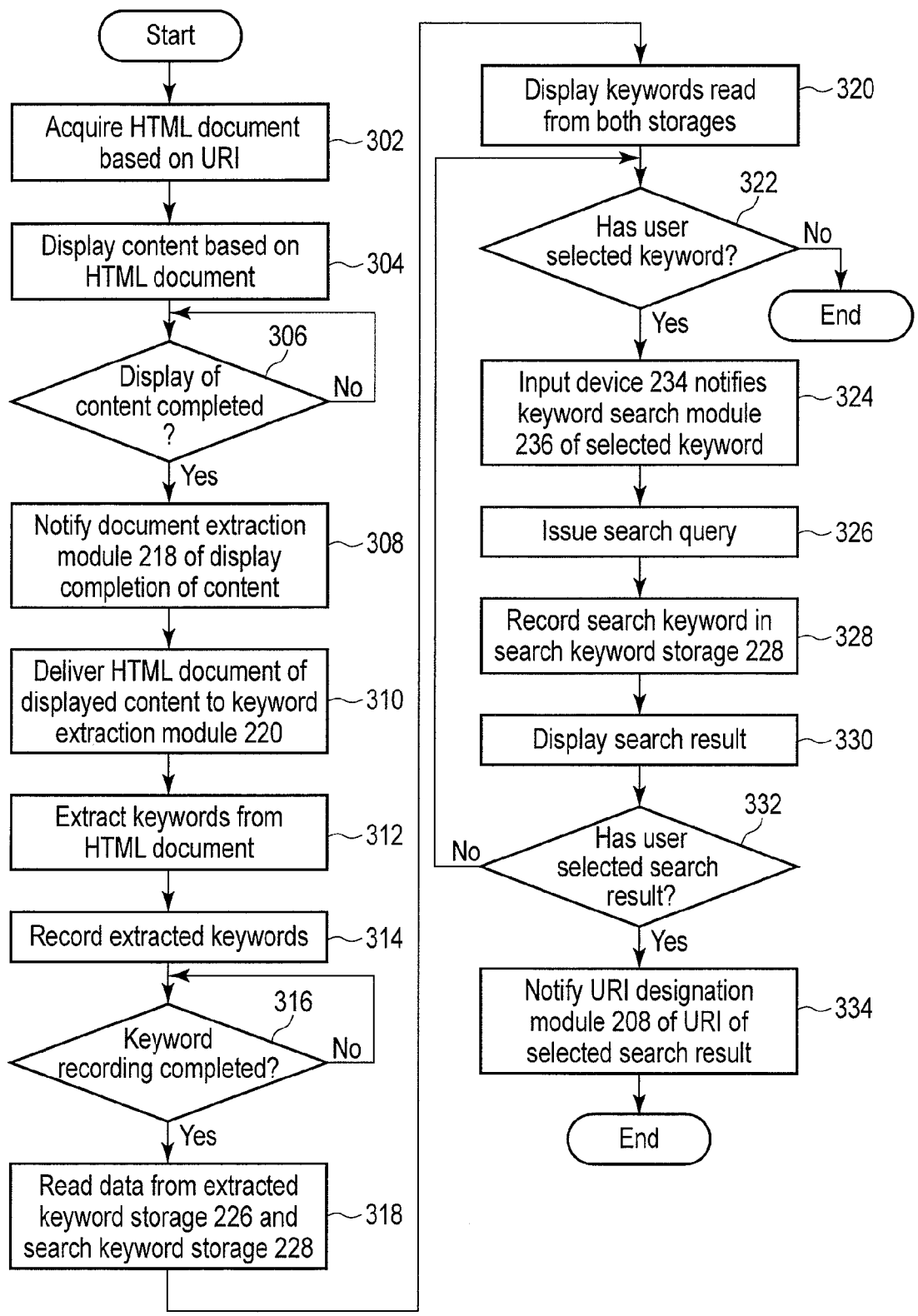
FIG. 3 is a view showing an example of a typical flowchart showing an information processing method according to the first embodiment.

FIG. 14 shows the processing associated with the keyword recording block 314 of the flowchart of FIG. 3. In block 1402, it is confirmed by the content read monitoring module 1316 that the content to be displayed has been wholly displayed by the content display 214. In block 1404, the document extraction module 1318 extracts an HTML document 212. In block 1406, the keyword extraction module 1320 extracts a keywords 224 from the extracted HTML document 212. In block 1408, keywords stored in the extracted keyword storage 1302 are copied into the past keyword storage 1304. In block 1410, the keywords 224 extracted by the keyword extraction module 1320 are stored in the extracted keyword storage 1302.

In the first and second embodiments, when the extraction of the keywords has been completed, the keyword is displayed as a gadget at all times. However, in the third embodiment associated with the slate type PC in which it is supposed that the screen is small, continuous display of keywords is not carried out. Keywords are displayed by an instruction of the user. Accordingly, in block 1502 of FIG. 15, the user uses the operation switches 1206, 1207 or 1210, or touches the monitor 1204 with his or her finger, whereby the input device 234 calls a function of displaying keywords by the keyword display 1332. In block 1504, the keyword reading module 1330 reads keywords from the extracted keyword storage 1302, thereafter reads keywords from the past keyword storage 1304 in block 1506. The keyword display 1332 displays both the read keyword groups on the monitor 1204 in block 1508.

After this, in the same manner as in and after block 332 of the flowchart (FIG. 3) of the first embodiment, it is determined in block 1510 whether or not selection of keywords has been carried out. When keywords have been selected, search using the selected keywords is carried out in block 1512, and the search results are displayed in block 1514. In block 1516, it is determined whether or not any one of the search results has been selected. When any one of the search results has been selected, a content URI corresponding to the selected search result is notified, in block 1518, to the URI designation module 1308, and the HTML document acquisition module 210 is instructed to acquire an HTML document of a designated URI from the content providing server 204.

A display state of the keywords to be displayed on the monitor 1204 by the keyword display 1332, and search result display 244 will be described below with reference to FIG. 17 and FIG. 18.

FIG. 17 is a view showing an example of a display screen configured to display keywords in the third embodiment. In the third embodiment, unlike the first embodiment and second embodiment, keywords are not shown at a part of the display screen of the contents as a gadget, and the overall display screen of the contents is switched to the display screen of the keywords. Accordingly, the extracted keywords and keywords extracted in the past are simultaneously displayed on the same screen without switching of the display. The display screen includes three areas. More specifically, the display screen includes a "just extracted keyword" area shown at the upper left, and configured to display keywords read from the extracted keyword storage 1302, "formerly extracted keyword" area shown at the lower left, and configured to display keywords read from the past keyword storage 1304, and "search result" area shown on the right of both the above-mentioned areas, and displayed according to the fact that a keyword shown in any one of the above-mentioned areas has been selected by the user.

Each of the keywords displayed in the "just extracted keyword" area, and "formerly extracted keyword" area in the list-like forms is displayed on the basis of the extraction date/time of the data table shown in FIG. 16. Accordingly, when the extraction dates/times are arranged in descending order, the keywords displayed in the "just extracted keyword" area, and "formerly extracted keyword" area are also arranged in descending order. However, keywords may not necessarily be arranged on the basis of the extraction date/time, and may be arranged on the basis of some sort of index. For example, as in the case of the first embodiment, keywords may be arranged in order of score.

On some keywords displayed in the "formerly extracted keyword" area, search marks (magnifying glass marks in FIG. 17) each indicating that the keyword has actually been used for a search are displayed. These search marks are displayed for keywords in each of which the search flag of FIG. 16 is true.

In FIG. 17, when a keyword "football" is selected, the screen changes as shown in FIG. 18.

When the keyword "football" in the "just extracted keyword" area is selected by the user, the search result of the keyword "football" is displayed in the "search result" area by the search result display 244 as in the case of FIG. 7. Each of the search result items of the search result includes a title of a web page, snippet, and URI of the contents displayed by the content display program 206.

In the third embodiment, although it is assumed that the display screen shown in FIG. 17 or FIG. 18 is displayed in the entire area of the monitor 1204 of the slate type PC 1202, it is also possible to display the display screen in part of the area of the monitor 1204, i.e., to display the display screen as a gadget as in the above embodiments by changing the size of the display screen shown in FIG. 17 or FIG. 18.

As described above, according to the third embodiment, it is possible for the user to simultaneously view "just extracted keywords" extracted from the content currently browsed by the user, "formerly extracted keywords (keywords which have actually been used for a search are displayed so that they can be distinguished from others)" extracted from the contents formerly browsed by the user, and a "search result" obtained by using a keyword selected by the user. Accordingly, unlike in the aforementioned embodiments, there is no need to switch the keyword display screen by using a tab, and the operability of keyword selection is improved. It is possible to display the display screen shown in FIG. 17 or FIG. 18 by an instruction from the user, and hence it is possible for the user to display the display screen shown in FIG. 17 or FIG. 18 on the monitor 1202 when the user wants to carry out keyword search. Accordingly, even in an apparatus having a small screen, it is possible to display keywords without obstructing display of the contents.

Next, a fourth embodiment will be described below. Descriptions of configurations and functions identical with the aforementioned embodiments will be omitted.

The fourth embodiment relates to modification of the first, second, and third embodiments. In the fourth embodiment, keywords are displayed on the keyword display screen, and categories of search objects are also displayed. The category of a displayed keyword is selected by the user, whereby search is carried out within the selected category. Accordingly, the efficiency of the search is improved.

Description will be given specifically with reference to FIG. 19. FIG. 19 is a view showing a screen configured to display keywords in the fourth embodiment.

A modification of FIG. 5 described in the first embodiment is shown in FIG. 19 as an example. An extracted keyword display screen $1902_1$ corresponds to the extracted keyword display screen $504_1$ of FIG. 5. A past search keyword display screen $1902_2$ corresponds to the past search keyword display screen $504_2$ of FIG. 5. Accordingly, the extracted keyword display screen $1902_1$ and past search keyword display screen $1902_2$ are switched to/from each other when a tab displayed at an upper part of each of the extracted keyword display screen $1902_1$ and past search keyword display screen $1902_2$ is selected by the user. Each of the extracted keyword display screen $1902_1$ and past search keyword display screen $1902_2$ is displayed in a gadget to be displayed on the LCD 104. However, in FIG. 19, in addition to the keywords, categories in which the keywords are searched for are displayed.

For example, on the extracted keyword display screen $1902_1$, on the right side of the keyword "football", categories "video", "photo", and "shopping" of the search object are displayed. More specifically, when the user wants to search for information associated with football within the category of video, it is sufficient if the user selects a button of "video" displayed on the right side of "football".

On the past search keyword display screen $1902_2$, in addition to the display manner identical with the above-mentioned extracted keyword display screen $1902_1$, as described in the second embodiment, search marks (magnifying glasses in FIG. 19) indicating keywords which have been used for a search or categories in which searches have been carried out are displayed. For example, when a search has been carried out only in a certain category, a search mark is displayed on the category (for example, the video category of football, photo category of butterfly) and, when a search has been carried out without designating the category, search marks are displayed on keywords (for example, swimming race, and gold medal).

Regarding the categories of search objects, in addition to video, photo, and shopping shown in FIG. 19, categories such as map, music, history, and the like may also be displayed. The display position of the category of each keyword may not be on the right side of each keyword, and may be on the left side, upper side or lower side. The category corresponding to each keyword may not necessarily be identical with a category corresponding to the other keyword, and a category different from the other keyword may be displayed for each keyword. The number of keywords and number of categories to be displayed are not limited to the example of FIG. 19.

Up to here, the display screen of keywords and the like of the fourth embodiment have been described.

Next, the processing system of the fourth embodiment will be described below. The system configuration of the fourth embodiment is identical with that of FIG. 2 used in the description of the first embodiment, and hence the configuration will be described with reference to FIG. 2.

As described above, when the user has selected any one of the categories displayed on the extracted keyword display screen $1902_1$ or on the past search keyword display screen $1902_2$, the keyword search module 236 issues a search query configured to search for a keyword corresponding to a selected category, i.e., information associated with the keyword displayed on the left side of the selected category as shown in FIG. 19 within the selected category. The issued search query is sent to the keyword search server 240, and a keyword search is executed within the selected category. When plural keyword search servers 240 are present and correspond to the plural categories displayed on the extracted keyword display screen $1902_1$ or on the past search keyword display screen $1902_2$, each of the keyword search servers 240 may execute keyword search corresponding each category.

Data to be stored in the search keyword storage 228 will be described below with reference to FIG. 20.

FIG. 20 is a view showing the data to be stored in the search keyword storage 228 in the fourth embodiment. The data includes the date/time on/at which keyword search has been carried out, keyword which has been used for a search, and category in which the search has been carried out. The number of items of data associated with the category may not be limited to only one, and the data may also be configured so that plural items of data associated with the category can be stored. For example, FIG. 20 shows that a search has been carried out with respect to the keyword "football" in the category of video.

The kind of the category is also stored in the data to be stored in the search keyword storage 228, whereby a keyword which has been used for a search or a search mark indicating the category of the search is displayed on the past search keyword display screen $1902_2$.

Although the fourth embodiment has been described above as a modification example of the first embodiment, the fourth embodiment can also be carried out as a modification of each of the second embodiment shown in FIG. 7, and third embodiment described in FIG. 18.

As described above, according to the fourth embodiment, the category of the search object is displayed together with the keyword, and hence the user can search for information associated with the keyword within the selected category only by selecting one of buttons of the category and, further the user can efficiently carry out a search within a narrowed-down category.

Next, a fifth embodiment will be described below. Descriptions of configurations and functions identical with the aforementioned embodiments will be omitted.

In the first to fourth embodiments, together with the keywords extracted by the information processing apparatus in which the content is currently displayed, although keywords which have been extracted by the apparatus in the past and/or which have actually been used for a search are stored, in the fifth embodiment, an information processing system that can share data including keywords which have been extracted in another apparatus and/or which have actually been used for a search with another apparatus is provided. This is useful when the same user browses contents by using plural types of terminals. For example, there is a case where after watching of a TV program, information associated with the program is searched for on the Internet.

Figure 21:
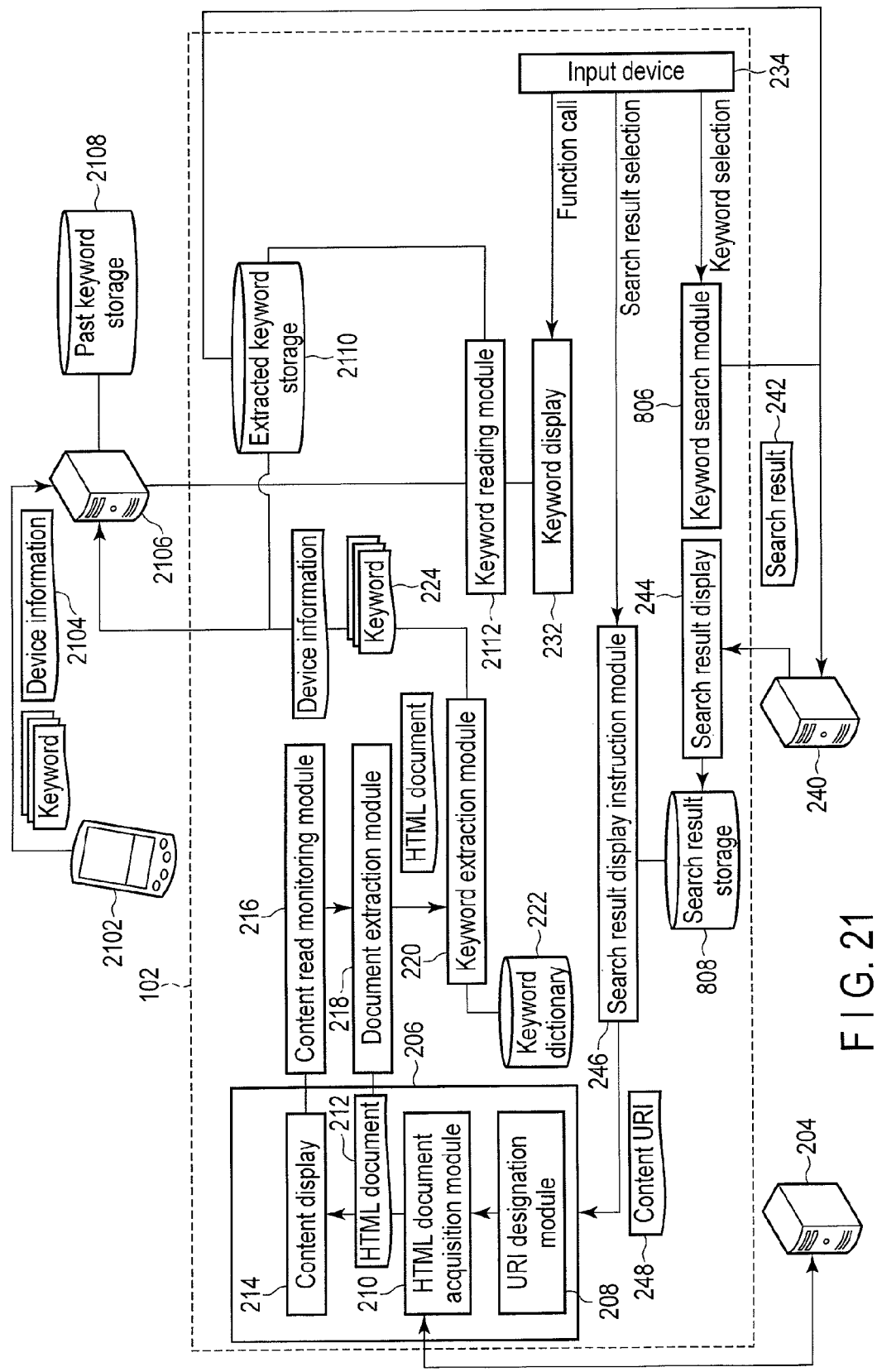
FIG. 21 is a block diagram showing the typical system configuration of an information processing apparatus according to a fifth embodiment.

A description will be given specifically with reference to FIG. 21. FIG. 21 is a view showing an information processing system including plural terminals in the fifth embodiment. The plural terminals are a mobile terminal 2102, the computer 102 of the first or the second embodiment, the slate type PC 1202 of the third embodiment, and the like. Here, although the description will be given assuming that the computer 102 is a host apparatus configured to collect keywords from other terminals, each of the other terminals also has a function of collecting keywords from other terminals.

The mobile terminal 2102 is, for example, a Smartphone, cellular phone or the like. Although details of the mobile terminal 2102 are not shown, the terminal 2102 has the configuration identical with the computer 102. The mobile terminal 2102 and computer 102 are connected to each other through a browse history management server 2106 on an external network, e.g., the Internet. A past keyword storage 2108 is included in the browse history management server 2106. The keyword extraction modules 220 and 1320 send keywords to the browse history management server 2106, and also send device information 2104 indicating an apparatus by which the keywords have been extracted to the browse history management server 2106.

Figures 22, 23:
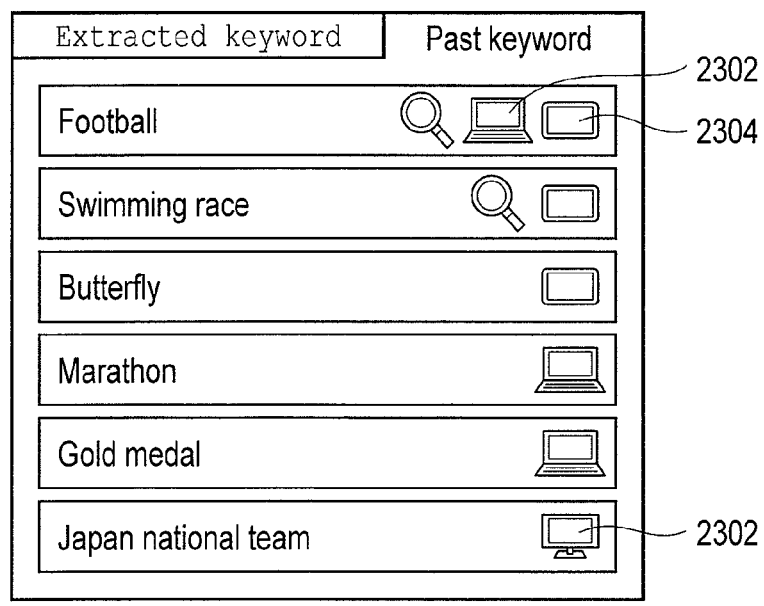
FIG. 22 is a view showing an example of typical data items stored in a past keyword storage according to the fifth embodiment.
FIG. 23 is a view showing a typical example of a display screen configured to display keywords according to the fifth embodiment.

The device information indicating the type of the apparatus is included in the data to be stored in an extracted keyword storage 2110. A description of the data will be given with reference to FIG. 22. FIG. 22 shows an example of data to be stored in the extracted keyword storage 2110 in the fifth embodiment. The data of FIG. 22 shows, from the left row, the date/time on/at which the keyword has been extracted or the date/time on/at which search has been carried out, extracted keyword, search flag, and apparatus by which the keyword has been extracted or by which a search has been carried out (hereinafter referred to as the terminal). The number of items of data associated with the terminal may not be limited to only one, and the data may also be configured so that plural items of data associated with the terminal can be stored. As a terminal corresponding to each keyword shown in FIG. 22, PC implying the computer 102 is shown. That is, it is shown that all the keywords shown in FIG. 22 have been extracted by the computer 102.

Next a display screen of the keywords in the fifth embodiment will be described below with reference to FIG. 23.

FIG. 23 is an example showing the display screen of keywords including types of plural terminals in the fifth embodiment. In FIG. 23, it is shown that the keywords have been extracted or retrieved by, for example, three terminals. More specifically, a terminal type mark 2302 indicating the computer 102, terminal type mark 2304 indicating the slate type PC 1202, and terminal type mark 2306 indicating a desktop personal computer are shown as the terminal type marks. Although not shown in FIG. 21, a desktop personal computer can also be connected to the browse history management server 2106 as a terminal of this embodiment. Although details of the desktop personal computer are not shown, the desktop personal computer has the configuration identical with the computer 102. Each mark is displayed on the basis of information shown in the item of the terminal of FIG. 22. That is, when the item of the terminal is PC, a terminal type mark 2302 indicating the computer 102 is displayed. For example, in order to indicate that the past keyword "football" of FIG. 23 has been extracted in the past by the computer 102 and slate type PC 1202, the terminal type mark 2302 (computer 102), and terminal type mark 2304 (slate type PC 1202) are displayed at the right part of the button of "football". Although a mark of a magnifying glass is displayed on the button of "football", this indicates that "football" has been retrieved as a keyword.

Regarding the terminal type marks, it is sufficient if the terminal by which the keyword has been extracted or retrieved can be made known, and the terminal type marks are not limited to the marks of FIG. 23.

In FIG. 21, the past keyword storage 2108 may not be connected to the browse history management server 2106 on the outside of the terminal, and may be inside the own terminal (computer 102). In this case, it is recommendable to configure the system in such a manner that data items extracted or retrieved by the terminals are synchronized with each other among the plural terminals without the intermediation of the browse history management server 2106.

The document to be extracted by the document extraction module 218 is not limited to an HTML document. For example, the document may also be a document from which keywords included in a TV program guide (lineup) can be extracted.

As described above, according to the fifth embodiment, keywords extracted by a certain terminal are also displayed by another terminal. Accordingly, the user can utilize the extracted keywords again to carry out a search regardless of the types of the terminals. That is, keywords included in the content browsed by a certain terminal are utilized by a terminal different from the certain terminal, whereby a search query is produced, and information associated with each of the keywords can be searched for. For example, when a TV program has been watched, keywords are extracted from a TV program guide (lineup) included in the TV program and, when the other terminal owns information on the extracted keywords jointly, the user can search for information associated with the TV program by using another terminal, for example, a mobile terminal after watching of the TV program.

Next, a sixth embodiment will be described below. Descriptions of configurations and functions identical with the aforementioned embodiments will be omitted.

The sixth embodiment relates to a modification of the fifth embodiment. In the fifth embodiment, although the extracted keyword storage 2110 is present in each terminal, in the sixth embodiment, an extracted keyword storage is not present in each terminal, but is present on an external server. Accordingly, in the fifth embodiment, although keywords currently extracted in other terminals cannot be shared, in the sixth embodiment, keywords currently extracted in other terminals can be shared, and the extracted keywords can be displayed in terminals other than the terminal by which the keywords have been extracted. The sixth embodiment is identical with the fifth embodiment in the matters other than the above.

FIG. 24 is a view showing an information processing system including plural terminals in the sixth embodiment. Both a past keyword storage 2108 and extracted keyword storage 2402 are included in a browse history management server 2400. Further, a keyword reading module 2404 reads keywords stored in the extracted keyword storage 2402 and past keyword storage 2108 through the browse history management server 2400. Accordingly, unlike the fifth embodiment, keywords extracted in each terminal can also be displayed in the other terminals. It is identical with the fifth embodiment that keywords which have been extracted in each terminal can be displayed in the other terminals. In FIG. 24, although an information processing system including the mobile terminal 2102 and slate type PC 1202 is shown, the system may be an information processing system including the mobile terminal 2102 and computer 102 as in the case of the fifth embodiment.

Data to be stored in the past keyword storage 2108 and extracted keyword storage 2402 will be described below with reference to FIG. 25.

FIG. 25 is a view showing an example of data to be stored in the past keyword storage 2108 in the sixth embodiment. The data includes items of, from the left, an extracted or retrieved keyword, keyword extraction date/time, search flag, and terminal. Unlike FIG. 22 described in the fifth embodiment, the search flag indicates true when the keyword has been retrieved, and indicates false when the keyword has not been retrieved. The same (FIG. 25) is true of the data to be stored in the extracted keyword storage 2402.

Next, a display screen of the keywords in the sixth embodiment will be described below with reference to FIG. 26.

FIG. 26 is a view showing an example of a display screen of the keywords in the sixth embodiment. As in the case of FIG. 17 described in the third embodiment, the display screen includes a "just extracted keyword" area arranged at the upper left, "formerly extracted keyword" area arranged at the lower left, and "search result" area arranged on the right of both of these areas. On the buttons of some keywords displayed in the "formerly extracted keyword" area, search marks (magnifying glass marks in FIG. 26) each indicating that the keyword has actually been used for a search are displayed. These search marks are displayed for the keywords in each of which the search flag of FIG. 25 is true. Furthermore, on the buttons of the keywords in the "just extracted keyword" area and "formerly extracted keyword" area, terminal type marks each indicating an apparatus by which the keyword has been extracted are displayed.

As described above, according to the sixth embodiment, keywords currently extracted in the other terminals can be shared by all the terminals together with keywords which have been extracted in the other terminals, and hence the user can select keywords in which the user is interested from a large number of keywords, and can efficiently search for various information items.

Next, a seventh embodiment will be described below. Descriptions of configurations and functions identical with the aforementioned embodiments will be omitted.

The seventh embodiment relates to a modification of the sixth embodiment, and provides, in addition to the functions of the aforementioned embodiments, an information processing system in which a browse history of each terminal can be shared by the other terminals. The system will be specifically described below with reference to FIG. 27.

Figure 27:
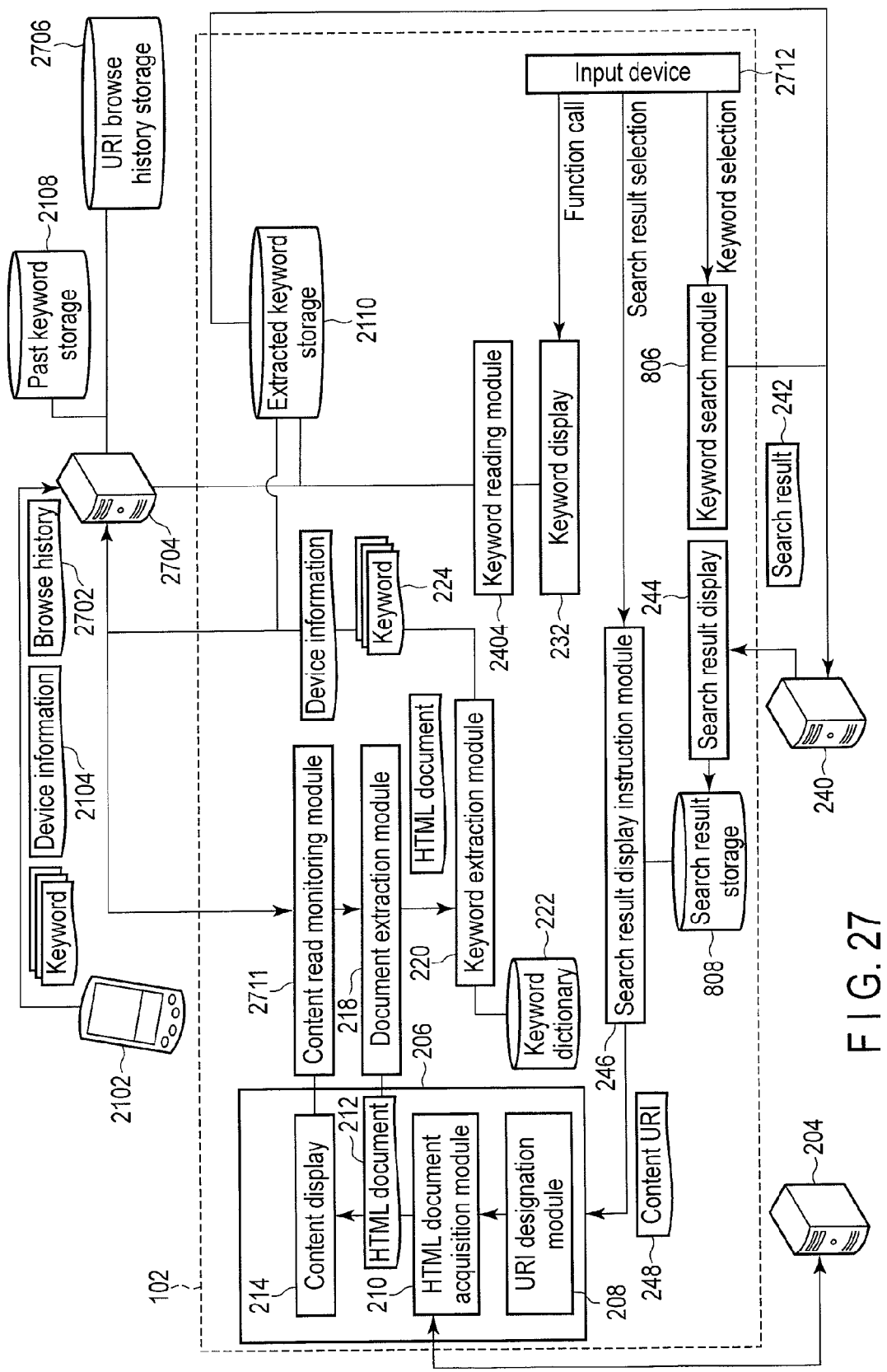
FIG. 27 is a block diagram showing the typical system configuration of an information processing apparatus according to a seventh embodiment.

FIG. 27 is a view showing an example of an information processing system including plural terminals in the seventh embodiment. A browse history management server 2704 is connected to plural terminals, for example, the mobile terminal 2102 and computer 102. Further, the browse history management server 2704 includes a content browse history storage 2706 in which a URI browsed by each terminal is stored. Although a content read monitoring module 2711 monitors the progress of display of contents carried out by the content display 214, when the display of the contents to be displayed is completed, the content read monitoring module 2711 sends the fact to the document extraction module 218, sends a browse history 2702 to the browse history management server 2704, and records the browse history 2702 including the browsed URI in the content browse history storage 2706. Likewise, the mobile terminal 2102 also sends a browsed browse history 2702 to the browse history management server 2704. A keyword reading module 2404 is connected to an extracted keyword storage 2110 and the browse history management server 2704, and reads extracted keywords, past keywords, and browsed URI from the extracted keyword storage 2110, past keyword storage 2108, and browsed URI storage, respectively. It should be noted that here, although the information processing system including the mobile terminal 2102 and computer 102 is shown, the system may also be an information processing system including other information processing apparatuses such as the mobile terminal 2102 and slate type PC 1202.

Next, an example of data to be stored in the content browse history storage 2706 will be described below with reference to FIG. 28.

FIG. 28 is a view showing an example of browse history data including a URI which has been browsed by each terminal in the seventh embodiment. The data includes items of, from the left, the browse date/time, title of contents which have been displayed by the content display 214, and have been browsed by the user, URI of the browsed contents, and terminal indicating information on a terminal by which the content has been browsed. For example, it is shown that in, for example, the computer 102, the content having a title "What is football?", and having a URI of http://word . . . have been browsed at 2010/11/24, 11:15:30.

Next, an example of a display screen based on the abovementioned data stored in the content browse history storage 2706 of the seventh embodiment will be described below with reference to FIG. 29.

FIG. 29 is a view showing an example of a display screen of a browse history of each terminal in the seventh embodiment. As in the cases of the aforementioned embodiments, a tab is displayed at an upper part of the display screen, and the extracted keywords, past keywords, and browsed URI can be switched. When the user selects the tab of the browsed URI, a title, URI, and mark indicating a terminal by which the content has been browsed are displayed as a label or a button on the basis of the data stored in the content browse history storage 2706, and shown in FIG. 28.

Returning to FIG. 27, when the user selects any label or a button of the browsed URI shown in FIG. 29, an input device 2712 receives a signal thereof, and notifies a search result display instruction module 246 of the fact. The search result display instruction module 246 sends the browsed URI selected by the user to the URI designation module 208. Thereby, a web page based on the selected browsed URI is displayed.

As shown in FIG. 29, although the display order of the browsed URIs may be based on the date/time shown in FIG. 28, alternatively the browsed URIs may also be displayed in order based on an arbitrary index or scores.

As described above, according to the seventh embodiment, the browse information of the URI and the like browsed in other terminals can be shared by all the terminals, and hence the browse history can be referred to regardless of the types of the terminals, and the content which has been browsed in the past in a certain terminal can be browsed in the other terminal again.

Next, an eighth embodiment will be described below. Descriptions of configurations and functions identical with the aforementioned embodiments will be omitted.

The eighth embodiment relates to a modification of the seventh embodiment. Although the seventh embodiment relates to the personal computer 102 like the first, second, and fourth embodiments, the eighth embodiment relates to the slate type PC 1202 like the third and sixth embodiments. That is, in the eighth embodiment, not in the manner shown in FIG. 29, in which the keywords are displayed at all times as a gadget, and display screen is switched by using the tab, but in the manner shown in FIG. 18 or the like, the content display screen is switched to the keyword/browse history display screen to be displayed on the same screen, and browse history which has been browsed by each terminal is displayed by the other terminals.

The processing means will be specifically described below with reference to FIG. 30.

FIG. 30 is a view showing an example of a processing system including plural terminals in the eighth embodiment. A content display 3012 is connected to a browse history extraction module 3008 through a browse history storage 3006. The browse history extraction module 3008 is connected to a browse history server 3002 including a past keyword storage 2108, extracted keyword storage 3004, and content browse history storage 3005. A browse history display 3009 is connected to an input device 2712, and is connected to the browse history server 3002 through a browse history reading module 3007.

The browse history storage 3006 stores the browse history such as the displayed web pages or the like in the form of a data table by using the content display program 206 such as the web browser or the like. Upon receipt of a signal indicating that the data table of the browse history storage 3006 has been updated, the browse history extraction module 3008 stores the updated browse history in the browse history server 3002.

FIG. 32 is a view showing an example of a data table of the browse history stored in the content browse history storage 3005. The data table includes items of, from the left row, the browsed title, snippet which is an extract of the text of the browsed content item, URI of the browsed content, browse date/time indicating the date/time at which the browse has been carried out, and terminal.

Next, a display screen example of the keyword/browse history of the eighth embodiment will be described below with reference to FIG. 31.

Figure 31:
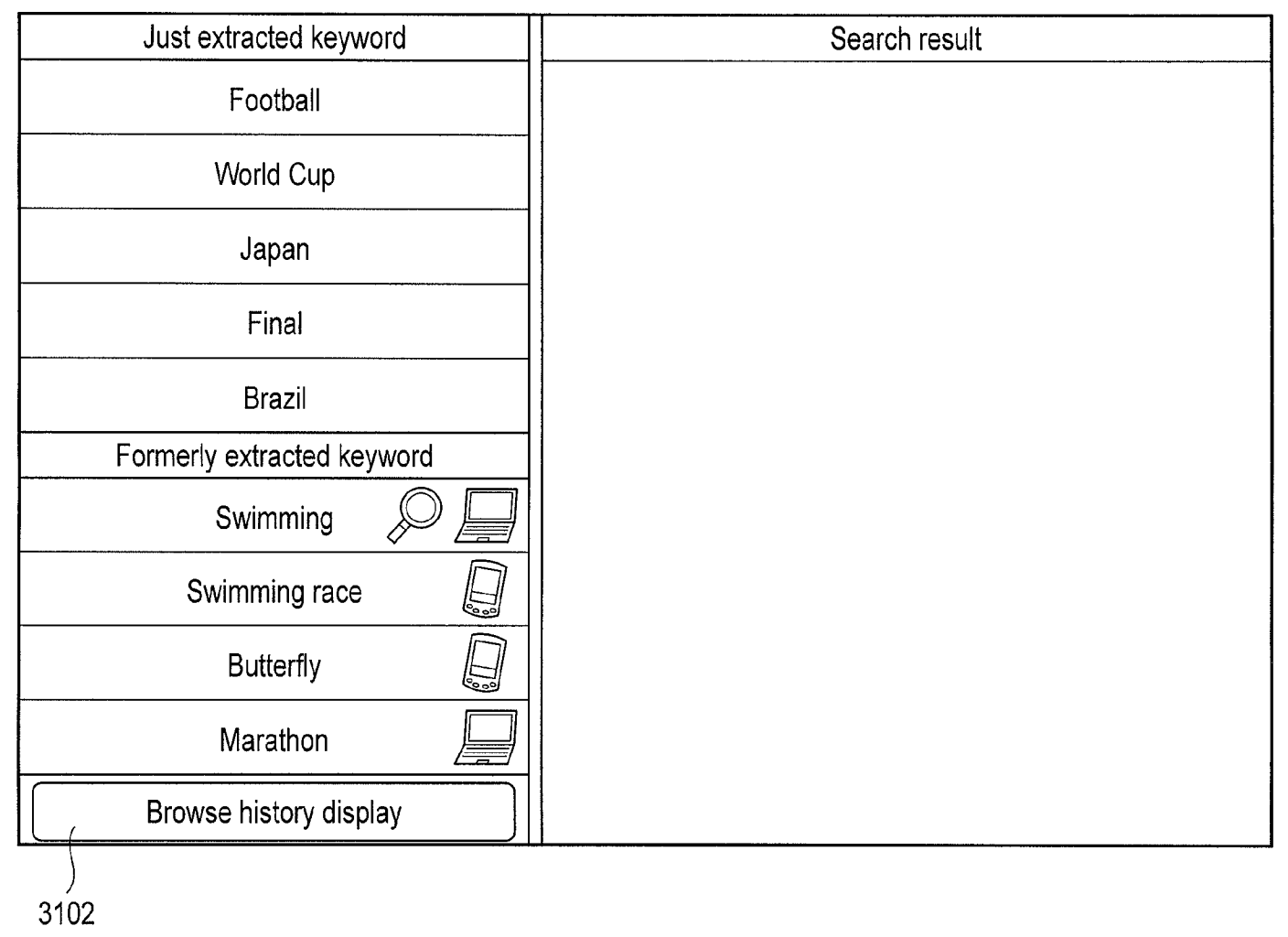

FIG. 31 is a view showing an example of a display screen including a browse history display button 3102. The browse history display button 3102 is displayed on the lower side of the "formerly extracted keyword" area. The display position of the browse history display button 31202 is not limited to this position, and may also be, for example, on the upper side of the "just extracted keyword" area.

Next, the display of a case where the browse history display button 3102 is selected by the user will be described below with reference to FIG. 33.

When the input device 2712 receives a signal indicating that the browse history display button 3102 has been selected by the user, the data table stored in each storage of the browse history server 3002, and shown in FIG. 32 is read by the browse history reading module 3007, and browse history display 3009 displays the browse history items on the area "browse history" on the right side in FIG. 33. The items 3302$_i$ (i=1 to 4) of the browse history include the title of the browsed content item, snippet, URI, and mark indicating a terminal by which the content has been browsed.

When the browse history items are displayed in the "browse history" area, if, for example, any one of the "just extracted keywords" is selected, the "browse history" area is switched to a "search result" area of the selected keywords as shown on the right side area of FIG. 18.

As described above, according to the eighth embodiment too, the browse history information such as the URI and the like browsed in other terminals can also be shared by all the terminals, and hence the browse history can be referred to regardless of the types of the terminals, and the content which has been browsed in the past in a certain terminal can be browsed in the other terminal again. Further, the browse history is displayed simultaneously with the keywords shared with the other terminals, and hence the efficiency of the search is improved.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
at least one hardware processor configured to:
acquire at least one first keyword extracted from a first content displayed by a first terminal and at least one second keyword extracted from a second content displayed by a second terminal, the first and second terminals different from the information processing apparatus; and
issue a search signal in accordance with a user selection from both the at least one first keyword and the at least one second keyword, the search signal for requesting an information related to a selected keyword which is any one of the at least one first keyword and the at least one second keyword; and
a display processor configured to display both the at least one first keyword and the at least one second keyword on a screen with information indicative of the terminal that extracted each keyword.

2. The information processing apparatus of claim 1, wherein the at least one first keyword and the at least one second keyword which are displayed by the display processor comprise a keyword extracted by the first terminal and a keyword extracted by the first terminal and used to issue the search signal.

3. The information processing apparatus of claim 1, wherein the at least one first keyword and the at least one second keyword which are displayed by the display processor comprise a keyword extracted from a content which is currently displayed by the display processor and a keyword extracted from a content which was displayed by the display processor.

4. The information processing apparatus of claim 3, wherein the display processor is configured to further display at least one third keyword extracted by the first terminal and used to issue the search signal, the at least one third keyword being distinguishably displayed from the at least one second keyword.

5. The information processing apparatus of claim 1, wherein:
the display processor is configured to further display at least one category related to at least one keyword extracted by the first terminal; and
the at least one hardware processor is configured to issue a search signal for requesting an information related to any of at least one category and the any of the at least one first keyword and the at least one second keyword.

6. The information processing apparatus of claim 1, further comprising:
a receiver configured to receive from another device a keyword extracted from a content, wherein
the display controller is configured to further display the keyword received by the receiver.

7. The information processing apparatus of claim 1, wherein the display processor is configured to display a first screen configured to display the at least one first keyword and a second screen configured to display the at least one second keyword wherein the first screen and the second screen are switchable.

8. The information processing apparatus of claim 1, wherein the display processor is configured to display a first screen configured to display the at least one first keyword and a second screen configured to display the at least one second keyword wherein the first screen and the second screen are simultaneously displayed.

9. An information processing method comprising:
acquiring, at an information processing apparatus, a keyword extracted from a first content displayed by a first terminal and at least one second keyword extracted from a second content displayed by a second terminal, the first and second terminals different from the information processing apparatus;
issuing a search signal in accordance with a user selection from both the at least one first keyword and the at least one second keyword, the search signal for requesting an information related to a selected keyword which is any one of the at least one first keyword and the at least one second keyword; and
displaying both the at least one first keyword and the at least one second keyword on a display of the information processing apparatus, with information indicative of a terminal that extracted each keyword.

10. The information processing method of claim 9, wherein the at least one first keyword and the at least one second keyword which are displayed comprise a keyword extracted by the first terminal and a keyword extracted by the first terminal and used to issue the search signal.

11. The information processing method of claim 9, wherein the at least one first keyword and the at least one second keyword which are displayed comprise a keyword extracted from a content which is currently displayed and a keyword extracted from a content which was displayed.

12. The information processing method of claim 11, further comprising:

displaying at least one third keyword extracted by the first terminal and used to issue the search signal, the at least one third keyword being distinguishably displayed from the at least one second keyword.

13. The information processing method of claim 9, further comprising:
   displaying at least one category related to at least one keyword extracted by the first terminal; and
   issuing a search signal for requesting an information related to any of at least one category and the any of the at least one first keyword and the at least one second keyword.

14. The information processing method of claim 9, further comprising:
   receiving from another device a keyword extracted from a content, and
   displaying the received keyword.

15. The information processing method of claim 9, further comprising:
   displaying a first screen configured to display the at least one first keyword and a second screen configured to display the at least one second keyword wherein the first screen and the second screen are switchable.

16. The information processing method of claim 9, further comprising:
   displaying a first screen configured to display the at least one first keyword and a second screen configured to display the at least one second keyword wherein the first screen and the second screen are simultaneously displayed.

17. A non-transitory computer-readable storage medium having stored thereon a computer program which is executable by a computer, the computer program comprising instructions capable of causing the computer to execute functions of:
   acquiring at least one first keyword extracted from a first content displayed by a first terminal and at least one second keyword extracted from a second content displayed by a second terminal;
   issuing a search signal in accordance with a user selection from both the at least one first keyword and the at least one second keyword, the search signal for requesting an information related to a selected keyword which is any one of the at least one first keyword and the at least one second keyword; and
   displaying both the at least one first keyword and the at least one second keyword on a screen with an information indicative of the terminal that extracted each keyword.

18. The storage medium of claim 17, wherein the at least one first keyword and the at least one second keyword which are displayed comprise a keyword extracted by the first terminal and a keyword extracted by the first terminal and used to issue the search signal.

19. The storage medium of claim 17, wherein the at least one first keyword and the at least one second keyword which are displayed comprise a keyword extracted from a content which is currently displayed and a keyword extracted from a content which was displayed.

20. The storage medium of claim 19, further comprising:
   displaying at least one third keyword extracted by the first terminal and used to issue the search signal, the at least one third keyword being distinguishably displayed from the at least one second keyword.

21. The storage medium of claim 17, further comprising:
   displaying at least one category related to at least one keyword extracted by the first terminal; and
   issuing a search signal for requesting an information related to any of at least one category and the any of the at least one first keyword and the at least one second keyword.

22. The storage medium of claim 17, further comprising:
   receiving from another device a keyword extracted from a content, and
   displaying the received keyword.

23. The storage medium of claim 17, further comprising:
   displaying a first screen configured to display the at least one first keyword and a second screen configured to display the at least one second keyword wherein the first screen and the second screen are switchable.

24. The storage medium of claim 17, further comprising:
   displaying a first screen configured to display the at least one first keyword and a second screen configured to display the at least one second keyword wherein the first screen and the second screen are simultaneously displayed.

* * * * *